United States Patent
Chen et al.

(10) Patent No.: US 9,191,191 B2
(45) Date of Patent: Nov. 17, 2015

(54) DEVICE AND METHODOLOGY FOR VIRTUAL AUDIO/VIDEO CIRCUIT SWITCHING IN A PACKET-BASED NETWORK

(71) Applicant: Sony Europe Limited, Weybridge (GB)

(72) Inventors: Jian-Rong Chen, Reading (GB); Daniel Wilson, Buckingham (GB); Daphne Economou, Thessalonica (GR)

(73) Assignee: SONY EUROPE LIMITED, Weybridge (GB)

( * ) Notice: Subject to any disclaimer, the term of this patent is extended or adjusted under 35 U.S.C. 154(b) by 0 days.

(21) Appl. No.: 13/965,962

(22) Filed: Aug. 13, 2013

(65) Prior Publication Data

US 2014/0016638 A1    Jan. 16, 2014

Related U.S. Application Data

(63) Continuation of application No. 12/805,816, filed on Aug. 20, 2010, now Pat. No. 8,625,589, which is a continuation of application No. 10/507,559, filed as application No. PCT/GB2004/000141 on Jan. 16, 2004, now Pat. No. 7,808,932.

(30) Foreign Application Priority Data

Jan. 16, 2003 (GB) .................................. 0301033.7
Mar. 31, 2003 (GB) .................................. 0307439.0

(51) Int. Cl.
*H04L 7/02* (2006.01)
*H04L 12/18* (2006.01)
(Continued)

(52) U.S. Cl.
CPC ........ *H04L 7/02* (2013.01); *H04L 12/18* (2013.01); *H04L 12/185* (2013.01);
(Continued)

(58) Field of Classification Search
None
See application file for complete search history.

(56) References Cited

U.S. PATENT DOCUMENTS

| 5,258,837 | A | 11/1993 | Gormley |
| 5,625,410 | A | 4/1997 | Washino et al. |

(Continued)

FOREIGN PATENT DOCUMENTS

| EP | 0 650 278 | 4/1995 |
| EP | 0 677 942 | 10/1995 |

(Continued)

OTHER PUBLICATIONS

McGraw-Hill, "Multimedia Over IP" McGraw-Hill Companies Inc., 2000.

(Continued)

*Primary Examiner* — Jae Y Lee
*Assistant Examiner* — Tito Pham
(74) *Attorney, Agent, or Firm* — Oblon, McClelland, Maier & Neustadt, L.L.P.

(57) ABSTRACT

A packet-based data network including: an audio/video network including a packet-switched network over which data including audio and/or video data packets can be carried; at least one data source connected to the network and operable to assemble packetized data comprising audio/video data at a first resolution and at a second resolution greater than the first resolution, and to transmit data packets carrying multiple audio/video streams at the first resolution by multicast network transmission; and at least one client connected to the network, being a data handling device for handling packetized audio/video data and being arranged to join the multicast group to receive the multiple audio/video streams at the first resolution. The client is associated with a graphical user interface configured in conjunction with a processor to select an audio/video stream.

17 Claims, 16 Drawing Sheets

(51) Int. Cl.
*H04L 29/06* (2006.01)
*H04L 12/751* (2013.01)
*H04L 12/761* (2013.01)
*H04N 21/4363* (2011.01)
*H04N 21/6405* (2011.01)
*H04L 12/931* (2013.01)

(52) U.S. Cl.
CPC ......... *H04L 29/06027* (2013.01); *H04L 45/10* (2013.01); *H04L 45/16* (2013.01); *H04L 49/351* (2013.01); *H04L 65/4076* (2013.01); *H04N 21/43632* (2013.01); *H04N 21/6405* (2013.01); *H04L 49/201* (2013.01); *H04L 49/352* (2013.01); *H04L 49/602* (2013.01)

(56) References Cited

U.S. PATENT DOCUMENTS

| | | | |
|---|---|---|---|
| 6,115,507 | A | 9/2000 | Eglit et al. |
| 6,160,544 | A | 12/2000 | Hayashi et al. |
| 6,331,983 | B1 | 12/2001 | Haggerty et al. |
| 6,466,550 | B1 | 10/2002 | Forster et al. |
| 6,564,262 | B1* | 5/2003 | Chaddha ................. 709/231 |
| 6,654,806 | B2 | 11/2003 | Wall et al. |
| 6,757,005 | B1 | 6/2004 | Elbaz et al. |
| 6,941,575 | B2* | 9/2005 | Allen ..................... 725/105 |
| 7,082,164 | B2 | 7/2006 | Chaddha |
| 7,103,011 | B2 | 9/2006 | Kumar et al. |
| 7,110,457 | B1* | 9/2006 | Chen et al. ............ 375/240.25 |
| 7,133,371 | B2 | 11/2006 | Helm et al. |
| RE40,256 | E | 4/2008 | Oshima et al. |
| 2002/0048275 | A1 | 4/2002 | Atwater et al. |
| 2002/0049979 | A1 | 4/2002 | White et al. |
| 2002/0097322 | A1 | 7/2002 | Monroe et al. |
| 2002/0133405 | A1 | 9/2002 | Newnam et al. |
| 2003/0142672 | A1 | 7/2003 | Chen et al. |
| 2003/0147390 | A1 | 8/2003 | Rizzo et al. |
| 2003/0174243 | A1 | 9/2003 | Arbeiter et al. |
| 2003/0179781 | A1* | 9/2003 | Kauschke et al. ............ 370/516 |
| 2003/0193619 | A1 | 10/2003 | Farrand |
| 2003/0197785 | A1* | 10/2003 | White et al. ............ 348/207.99 |
| 2004/0001091 | A1 | 1/2004 | Kressin |
| 2004/0078828 | A1* | 4/2004 | Parchman et al. ............ 725/135 |
| 2004/0215812 | A1* | 10/2004 | Lu ................................. 709/233 |
| 2004/0240466 | A1* | 12/2004 | Unitt et al. .................... 370/461 |
| 2004/0254913 | A1* | 12/2004 | Bernstein et al. ................ 707/2 |
| 2006/0010245 | A1 | 1/2006 | Carnahan |
| 2006/0146184 | A1 | 7/2006 | Gillard et al. |
| 2006/0203819 | A1 | 9/2006 | Farinacci et al. |

FOREIGN PATENT DOCUMENTS

| | | |
|---|---|---|
| EP | 0 967 753 | 12/1999 |
| JP | 10-313454 | 11/1998 |
| JP | 2002-237844 | 8/2002 |
| WO | WO 01/99370 | 12/2001 |

OTHER PUBLICATIONS

James Curtis, "UDP vs TCP", Web Publication, Jan. 2000.
Foresight Imaging, "I-RGB 165 & 200 Frame Grabbers and Video Streamers", Press Release, ThomasNet, Feb. 2002.
Ishikawa, et al, Transactions of Information Processing Society of Japan, "An Architecture for User Authentication of IP Multicast and Its Implementation",1999, vol. 40, No. 10, pp. 3728-3736.
Open Design, "IP Multicast", 1997, No. 22, pp. 38-67.

* cited by examiner

| ETHERNET HEADER | IP MULTICAST HEADER | UDP HEADER | RTP | PAYLOAD TYPE | AUDIO/VIDEO PAYLOAD DATA | C R C |

FIG. 3A  AUDIO/VISUAL

| ETHERNET HEADER | IP HEADER (NOT MULTICAST) | UDP/TCP HEADER | MESSAGE | C R C |

FIG. 3B  AVSCP/CNMCP

| ETHERNET HEADER | IP HEADER (NOT MULTICAST) | UDP | MESSAGE | C R C |

FIG. 3C

Example of the current flow assignment

Example of a packet with a tag

… …

DEVICE AND METHODOLOGY FOR VIRTUAL AUDIO/VIDEO CIRCUIT SWITCHING IN A PACKET-BASED NETWORK

CROSS REFERENCE TO RELATED APPLICATIONS

The present continuation application claims the benefit of priority under 35 U.S.C. 120 to application Ser. No. 12/805,816, filed Aug. 20, 2010, and to application Ser. No. 10/507,559, filed Apr. 18, 2005, now U.S. Pat. No. 7,808,932, issued Oct. 5, 2010, which is the National Stage of PCT/GB04/00141, filed on Jan. 16, 2004, and claims the benefit of priority under 35 U.S.C. 119 from United Kingdom Application Nos. 0301033.7 filed on Jan. 16, 2003 and 0307439.0, filed on Mar. 31, 2003. The entire contents of each of these documents are incorporated herein by reference.

FIELD OF INVENTION

The present invention relates to video and/or audio networks and to video and/or audio network management arrangements.

DISCUSSION OF RELATED ART

It is known to link video and audio devices in a studio together using a switching device, typically a cross point switch. The conventional cross point switch arrangement is inflexible requiring particular pieces of studio equipment to be connected to specific physical ports of the switch. It also requires a switching structure having a capacity proportional to the square of the number of inputs.

In practice the actual ports of the cross point switch are physically labelled to indicate what is connected to them. Changes in the configuration of the network are difficult and require re-labelling and reconfiguration of the network.

It is desirable to provide a more flexible arrangement.

SUMMARY

According to one aspect of the present invention, there is provided a packet-based data network comprising:
a packet-based network switch;
a plurality of packetised data sources coupled to the network, the packetised data comprising at least one of audio data or video data;
at least one destination, being a data handling device for handling data from the packetised data sources, coupled to the network; and
a network control arrangement coupled to the network, the network control arrangement being arranged to provide virtual circuit-switched connections for transfer of packetised data from sources to destinations via the network switch by:
a) assigning multicast group identifiers to the sources, so that the sources launch packetised data onto the network as multicast data packets identified by the multicast group identifiers; and
b) instructing a destination to issue a request to the network switch to join the multicast group of a source so as to receive data packets from that source.

Thus, by having a packet-based network providing virtual (emulated) circuit-switched connections, at least some of the physical limitations of a cross point switch can be avoided while retaining the simple concept of a cross-point switched arrangement.

The network control arrangement preferably supervises, controls and configures the source and destination nodes to provide the virtual circuit-switched connections via packet switching techniques. Because the network control arrangement operates by packet switching, the need to connect particular equipment to particular physical ports is avoided. Indeed, in embodiments of the invention it is possible to use a conventional network switcher and network arrangements such as (for example) so-called category 5 or category 6 data cabling.

Preferably the network control arrangement provides a graphical user interface for a user to manually provide and/or to view data relating to the configuration of the network.

This invention also provides a network control arrangement for use in a packet-based data network having a packet-based network switch; a plurality of packetised data sources coupled to the network operable to generate packetised data comprising at least one of audio data or video data; and at least one destination, being a data handling device for handling packetised data from the packetised data sources, coupled to the network;
the network control arrangement being arranged to provide virtual circuit-switched connections from sources to destinations via the network switch by:
a) assigning multicast group identifiers to the sources, so that the sources data comprising at least one of audio data or video data onto the network as multicast data packets identified by the multicast group identifiers; and
b) instructing a destination to issue a request to the network switch to join the multicast group of a source so as to receive data packets from that source.

This invention also provides a method of operation of network control arrangement in a packet-based data network having a packet-based network switch; a plurality of packetised data sources operable to generate data packets comprising at least one of audio data or video data, the data sources being coupled to the network; and at least one destination, being a data handling device for handling data from the packetised data sources, coupled to the network;
the method comprising the steps of providing virtual circuit-switched connections for transfer of packetised data from sources to destinations via the network switch by:
a) assigning multicast group identifiers to the sources, so that the sources launch video packetised data onto the network as multicast data packets identified by the multicast group identifiers; and
b) instructing a destination to issue a request to the network switch to join the multicast group of a source so as to receive data packets from that source.

Further respective aspects and features of the invention are defined in the appended claims.

BRIEF DESCRIPTION OF THE DRAWINGS

Embodiments of the invention will now be described, by way of example only, with reference to the accompanying drawings in which:

FIG. 3A is a schematic diagram of the format of an audio or video packet used in the network;

FIG. 3B is a schematic diagram of the format of an AVSCP or CNMCP packet used in the network;

FIG. 3C schematically illustrates a unicast data packet;

DETAILED DESCRIPTION

Overview and Terminology

Figure 1:
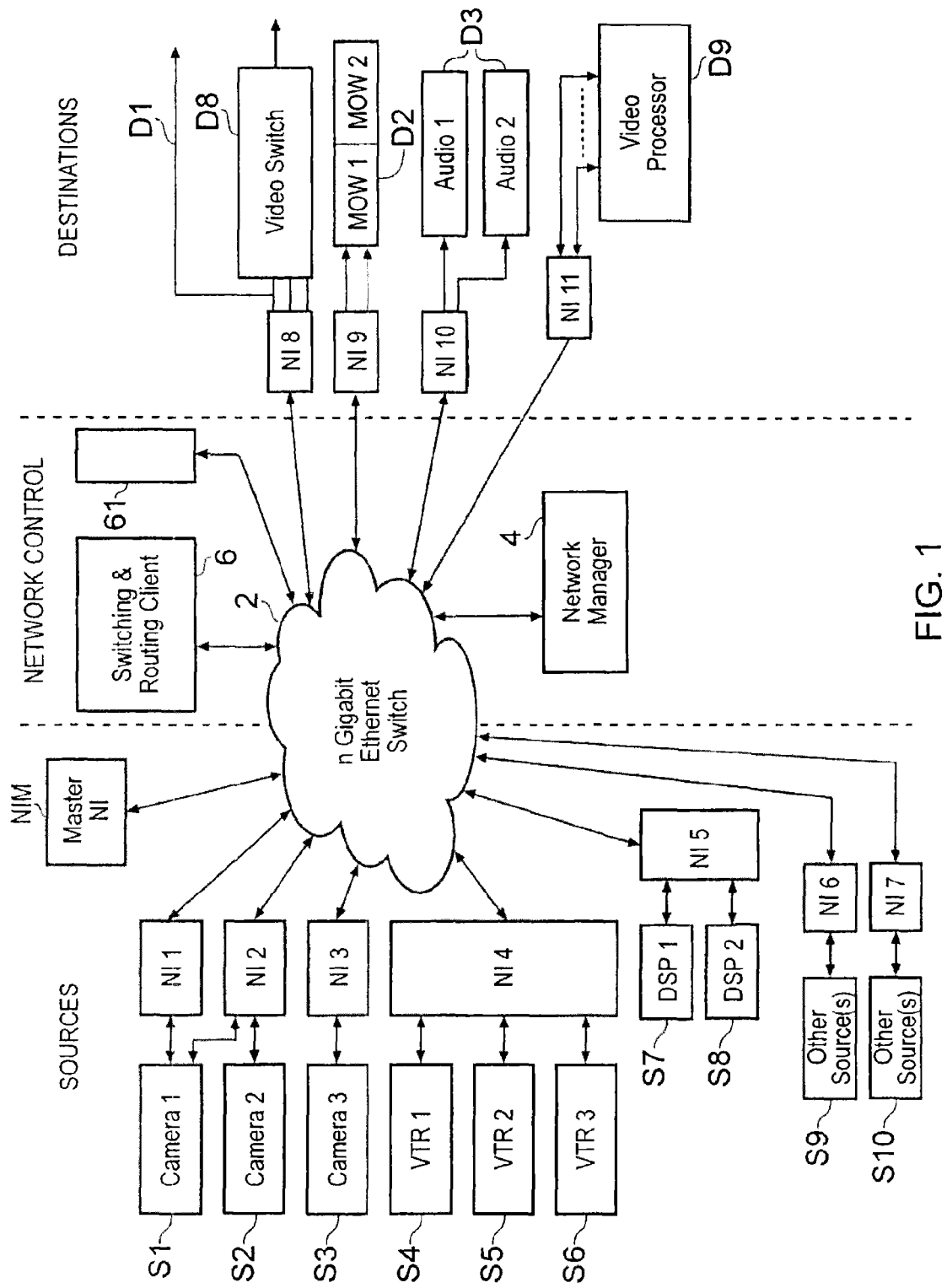
FIG. 1 is a schematic block diagram of a network in a studio.

Referring to FIG. 1, a network is installed in for example a studio. The network comprises a plurality of source group AV devices consisting of three cameras S1 to S3, three video tape recorders (VT10s) S4 to S6, two digital signal processors (DSPs) S7,S8 and two other source groups S9, S10 which generate serial digital audio data only. The network further comprises a set of destination group AV devices consisting of a video switch D8, a pair of monitors D2, a pair of audio processors D3 and a video processor D9. An Ethernet switch 2 effects connections between source group devices and destination group devices. All of the group devices S1 to S10 and D1, D2, D3, D8, D9 are connected to the network via at least one Enhanced Network Interface Card (ENIC) NI1 to NI11, which differs from a standard network interface card and whose structure and function is described below with reference to FIG. 4. The network further comprises a network control arrangement consisting of a first switching and routing client 6, an additional switching and routing client 61 and a network manager 4. A user may request a change in the current configuration of the virtual circuit-switched connections of the network via a Graphical User Interface (GUI) generated by a computer software application, which in this arrangement is displayed on a monitor associated with the switching and routing client 6. However, in alternative arrangements the GUI is displayed on a monitor associated with the network manager 4. The GUI is described in detail below with reference to FIGS. 9 to 12.

The network is an Ethernet multicast network comprising the Ethernet switch 2, which is an asynchronous nGigabit Ethernet switch 2, where n is 1 or 10 for example. Connected to the Ethernet switch 2 are network nodes comprising the source "groups" S1 to S10, the destination "groups" D1, D2, D3, D8 and D9, and the network control arrangement, which in this example comprises the network manager 4 and the switching and routing clients 6, 61.

A source group is defined to be an AV device such as a camera S1 or a video tape recorder (VTR) 54 that is operable to generate or supply audio and/or video data for transmission across the network, the source group having one or more input and/or one or more output terminal. Each input/output terminal of the AV device will be connected to a port of one of the ENICs NI1 to NI11. However, different terminals of the same AV device may be connected to different ENICs as in the case of source group S1 in FIG. 1, which has a first output terminal connected to ENIC NI1 and a second output terminal connected to ENIC NI2. A destination group is defined to be an AV device such as a video switch D8, video processor D9 or audio processor D3, that is operable to receive packetised audio and/or video data via the network and to perform processing operations on the received data. Similarly to the source group, the destination group comprises one or more inputs and/or one or more outputs which can be connected to different ports of the same ENIC or to different ENICs.

It will be appreciated that a destination group may also act as a source and a source group may also act as a destination for different data exchange events on the network. For example the VTR 54 has audio, video, status and proxy source and/or destination devices associated with it and for a data exchange event involving output of data across the network from a video source device on the VTR 54 to the video processor D9, the VTR 54 acts as a source group. A different data exchange event may involve the VTR 54 receiving data from a camera S1 that has been routed via the network through the video processor D9 for subsequent recording by the VTR 54, in which case, the processed video data will be received from the network at a destination device (ENIC input terminal) associated with the VTR 54 for subsequent supply to the VTR 54 in serial digital form for recording so that the VTR 54 acts as a destination group in this context.

Whilst the AV devices themselves are denoted source groups S1 to S10 and destination groups D1, D2, D3, D8, D9 each of these groups is connected to one or more ENIC ports. The ENIC ports will be denoted "source devices" and "destination devices". A "source device" is defined to be an ENIC output port, which outputs packetised data onto the network or outputs serial digital data to a destination group AV device whereas a "destination device" is defined to be an ENIC input port, which receives either packetised data from the network or serial digital data from a source group AV device output terminal. The source devices and destination devices of an ENIC can be associated with the source groups (AV devices) from which they receive data for transmission across the network or the destination groups to which they deliver data from the network. The network manager 4 keeps track of the mappings between ENIC ports and AV devices.

The network manager 4 stores a freely assignable alphanumeric label denoted "tally text" for each source group S1 to S10 of the network. An example of tally text is a name such as "VTR1" which may be given to a source group S4 or a cameraman's name e.g. "Jim" which may be given to the source group camera S1. The tally text is recorded at the network manager. All groups connected to the network may be named in this way. Source devices and destination devices of the ENIC may be labelled with tally text derived from the associated source group or destination group AV device. To enable connection to the network, each source group S1-S6 and each destination group D1, D2, D3, D8, D9 is coupled to the Ethernet switch 2 by at least one network interface card NI 1 to 11. These network interface cards are specially adapted for transmission of audio and/or video data across the network according to the present technique and are denoted ENICs (Enhanced Network Interface Cards). A single source or destination group may be connected to a plurality of ENICs, for example, in the arrangement of FIG. 1, the camera source group S1 is connected to two different ENICs, that is, NI1 and NI2. In particular, one subset of source devices (output terminals) and destination devices (input terminals) of the source group are connected to the first ENIC NI1 whereas another different subset is connected to the second ENIC NI2. Each ENIC NI1 to NI8 has a plurality of ports. Input ports of a first subset of the ENICs, NI1 to NI7 receive data directly from source groups such as cameras SI1 to SI3, VTRs S4 to S6 and DSPs S17, SI8 and the output ports of those ENICs transmit packetised data across the network, whereas input ports of a second subset of the ENICs, NI8 to NI1, receive packetised data derived from other source groups across the network whilst their output ports supply serial digital audio and/or video data to destination groups such as the video switch D8 and audio processors D3. The network optionally also comprises a master ENIC NIM 63 (See FIG. 1) which will be described in more detail in the section Frame Start Alignment below.

In a conventional studio, the source groups, e.g. cameras and destination groups e.g. video processors are connected by a cross point switch. The conventional cross point switch requires specific known devices to be connected to corresponding specific known ports on the switch to ensure that they can be connected together via switch. By way of contrast, the network of FIG. 1, including the Ethernet switch 2, is configured by the network manager 4 and by the switching and routing client 6 to provide virtual circuit-switched connections that emulate a crosspoint switch at least to the extent that any one or more source groups can be connected to any one or more destination groups. The virtual circuit-switched connections are facilitated by implementation, in the arrangement of FIG. 1, of an Internet Protocol (IP) multicast network that uses a known protocol, IGMP (Internet Group Management Protocol). The multicast network enables transmission of data from one source device to several destination devices belonging to a predetermined multicast group across the network and IGMP provides a means of identifying which multicast group a source device or destination device belongs to. Each source device and destination device is assigned an identifier and predetermined source device identifiers and destination device identifiers are associated with a given multicast address in order to define the virtual connections. Unlike the conventional cross point switch network, in the network of FIG. 1 the actual physical ports of the Ethernet switch 2 to which the source devices and destination devices are connected are irrelevant because the connections are flexibly specified using the identifiers and multicast addresses and associated communication protocols.

It should be noted that in the example arrangement of FIG. 1 the network operates as follows: a single source device should belong to only one multicast group that is not shared by any other sources. At least one destination device receives data from that source device by joining the source device's multicast group. A given destination device joins a multicast group in order to receive data from the associated source device by issuing a multi cast group join message. The network control arrangement 4, 6, 61 initiates each virtual circuit-switched connection by sending a control message to the destination device (i.e. to an input terminal of one of destination group AV devices or a corresponding ENIC terminal) instructing the device to issue a request to the Ethernet switch 2 to join the multicast group of the appropriate source device. Multiple destination devices can join a given multicast group and the Ethernet switch 2 performs the required duplication of the data from the source device transmitting to that multicast group. The data that may be transmitted by a source device to the plurality of destination devices of the multicast group includes video data, audio data, timecode data or status data.

Overview of ENICs

The functionality of the ENIC is described in more detail below with reference to FIG. 4. An ENIC allows any source group, for example a camera, and any destination group, for example a VTR, which is not designed for use with a multicast network to be used in a multicast network. An ENIC is a "dumb" device which can be requested to supply and receive audio, video, and control data streams. An ENIC cannot view or initiate any change to the configuration of the network. Rather, the network manager 4 controls to which multicast group(s) a given ENIC may subscribe and directs the ENIC to issue requests to the Ethernet switch 2 to join those multicast groups. Although, in the arrangement of FIG. 1, The ENICs NI1 to NI11 are distinct entities from the source group and destination group AV devices with which they are associated, it will be appreciated that in alternative arrangements the functionality of an ENIC could be integrated into an AV device. Each ENIC has an associated Ethernet address and an IP address. The Ethernet address is a 48-bit value that specifies a physical address within the LAN whereas the IP address is (in for example IPv4) a 32-bit value that identifies each sender or receiver of packet-based information across the Internet. The Ethernet address typically differs from the IP address but the two addresses can be mapped to each other e.g. using Address Resolution Protocol (ARP). The IP address is required to enable the Ethernet switch 2 to route data to and from the ENIC. Each data stream associated with the ENIC is identified using both a multicast address and a User Datagram Protocol (UDP) port number. UDP is a transport layer protocol that together with IP mediates data communication across the network. UDP provides port numbers to distinguish different transaction requests (this service is not provided by IP). In this embodiment a single IP address is associated with each ENIC. However, in alternative embodiments multiple IP addresses could be associated with a single ENIC. Besides the Ethernet address and IP address, the ENIC also has an associated ENIC identifier (ID) and a plurality of port IDs for respective ones of the destination devices and source devices associated with the ENIC. All of the addresses and IDs associated with each ENIC are recorded by the network manager 4. The source devices and destination devices (i.e. individual inputs and outputs of the network node devices S1-S8 and D1, D2, D3, D8, D9) correspond to respective ones of one or more physical inputs and outputs of an ENIC. An ENIC acts as a switch which switches data received from the switch 2 to a specified physical output of the ENIC and switches data from a specified physical input to the switch 2.

The network, implemented using the Ethernet switch 2, is asynchronous. However video and audio data need synchronous processing. The ENICs provide synchronous operation across the network and align frames of different video streams for purposes such as editing. The video and audio devices (i.e. source groups and destination groups) connected to the network operate on serial digital data, for example using the digital standard Serial Digital Interface (SDI) for interface of component digital video or the Audio Engineering Society (AES) digital audio standard for audio data. The ENICs convert data from the source device at the transmission end from SDI or AES serial digital format to a packetised format suitable for transmission across the network, in particular to multicast UDP/IP data packets. At the receiving end, the ENICs convert multicast UDP/IP data packets received from the network to a serial digital data format suitable for delivery to the destination device. A further functionality provided by the ENICs is to generate from a full resolution video stream a reduced resolution video stream denoted "proxy video". The proxy video is a reduced-bandwidth version of the corresponding full-resolution video information and, as such, is suitable for processing by network clients having restricted storage capacity and/or processing power or for use in previewing information content for downloading across the network.

Overview of Network Manager

The network manager 4 co-operates with the switching and routing clients 6, 61 form the network control arrangement that is operable to assign multicast group identifiers to the audio and video source devices and to instruct destination devices to issue requests to the Ethernet switch 2 to join a particular multicast group in order to receive data, from the corresponding source device. The network manager 4 maintains information of the current state of the network and all instructions that initiate a change to the device configuration or to the network connectivity originate from the network manager 4. In the arrangement of FIG. 1, the network manager is a Personal Computer (PC) that is linked to the network via a standard network interface card. In alternative arrangements the network manager could be for example a workstation and the network control arrangement may comprise more than one network manager.

The network manager 4 maintains a database specifying the configuration of the network. In the arrangement of FIG. 1, the database is stored on the same PC as the network manager 4 but in alternative arrangements it could be stored on at least one different PC. The database records, for each ENIC, the associated Ethernet address, the IP address, the ENIC ID and the source devices and destination devices (inputs and outputs of the network node devices) currently connected to the network via that ENIC. The section below entitled "Network Configuration Data" describes four different categories of device for which the network manager 4 stores configuration data. The network manager 4 also performs the functions of: allocating network resources to the switching and routing client(s) 6, 61 and to the ENICs NH to NI11; sending commands to the destination devices to issue requests to the Ethernet switch 2 to join a specified multicast group thereby changing the audio and/or video virtual circuit-switched connections across the network; and ensuring that each switching and routing client's 6, 61 view of the network is correct.

Network Configuration Data

The network manager stores and maintains a set of data relating to each of a number of different categories of device on the network. Since control messages are sent from the network control manager 4 to the ENICs NI1 to NI11 (rather than to input/outputs), each ENIC port is categorised as belonging to one of a plurality of device types/categories. The "source device" and "destination device" have already been discussed above.

In particular, the network configuration data is of four basic types relating to four different types of device (ENIC input/output ports) and a fifth data type associated with a group of devices that are commonly controlled. The four basic device types are:

1. SOURCE device: video, audio and status data from a source device is appropriately formatted by an ENIC and transmitted to a multicast group on the network. Each SOURCE device can also transmit a low-bandwidth video proxy.

2. DESTINATION device: video, audio and status data from the network is received by a destination device by joining a multicast group.

3. CONTROL SOURCE device: control commands are generated by an ENIC or by a network client and are transmitted unicast to a predetermined CONTROL DESTINATION.

4. CONTROL DESTINATION device: this receives control commands unicast from a CONTROL SOURCE.

The switching and routing client 6 cannot directly access the SOURCE and CONTROL DESTINATION devices. These devices are members of a CONTROL SOURCE GROUP, which is a group of devices that cannot be controlled independently. For example, a standard SDI video output and a super SDI output from a VTR are both connected to an ENIC for transmission onto the network 2. The SDI input is represented as four SOURCE devices comprising two video source devices, $V_0, V_1$ (one from the SDI output and one from the super SDI output) and two audio source devices $A_0, A_1$ in the network configuration. These four source devices are generated by the same physical device (the source group is the VTR). The four source devices have a common time code and stream status, i.e. stop, FF (fast forward), rew (rewind), etc. Hence these four source devices are jointly controlled via a control source group rather than being independently controlled.

A predetermined set of information (a data structure) is stored by the network manager 4 in relation to each of the above device types i.e. source, destination, control source control destination and control source group in addition to an ENIC data structure described below.

For the SOURCE device, the network manager stores the following data:—a 32-bit ID of which the most significant 16 bits specify the ENIC ID and the least significant 16 bits specify the UDP port ID; an 8-bit value specifying the data type (audio, video or status data); a 32-bit value specifying the CONTROL SOURCE GROUP to which the source device belongs; a first 32-bit multicast IP address specifying the destination device that the source transmits to and a second 32-bit multicast IP address specifying the destination device to which the video proxy is transmitted; 64 bytes of tally text information; a 32-bit "LINK" value specifying a destination device ID associated with a destination device that supplies the given source (a linked source is one that is supplied by a destination device (e.g. chroma keyer) that receives data via the network and subsequently outputs processed data onto the network as a source for another network device); a 32-bit value specifying the number of video lines to delay transmission by for a video source; and an 8-bit state value specifying if the source is currently enabled to transmit data across the network.

For the DESTINATION device, the network manager stores the following data:—a 32 bit ID of which the most significant 16 bits specified the ENIC ID and the least significant 16 bits specifies the UDP port ID; an 8-bit value specifying the data type (audio, video or status data); a 32-bit value specifying the IP address of the ENIC that implements the destination device; a 32-bit value MCAST_SRC_IP specifying the multicast IP address from which the destination device receives data; a 32-bit value specifying the source device that transmits to the multicast IP address with to which the destination device is assigned; an 8-bit tally text index; a 32-bit value specifying a source device ID associated with a source device that is supplied by the destination device (a linked destination is one that supplies a source); a 32-bit line delay value that specifies the number of video lines by which to delay playout; and an 8-bit status value specifying whether the destination device is on-air, off-air, controlled etc.

For the CONTROL SOURCE device the network manager 4 stores the following data set:—a 32-bit ID of which the most significant 16 bits specified the ENIC ID and the least significant 16 bits specifies the UDP port ID; a 32-bit value specifying an ID of the control destination device to which messages are to be transmitted; a 32-bit IP address and a 16 bit UDP port address of the ENIC that implements the specified control destination device; a 32-bit IP address and a 16-bit UDP address of the ENIC that implements the actual control source device.

For the CONTROL DESTINATION device the network manager 4 stores the following data set:—a 32-bit ID of which the most significant 16 bits specify the ENIC ID and the least significant 16 bits specify the UDP port ID; a 32-bit ID of the control source group to which the specified control destination device belongs; a 32-bit ID of the control source to which the control destination is connected; a 32-bit IP address and 16-bit UDP address of the ENIC that implements the associated control source; and a 32-bit IP address and 16-bit UDP address of the ENIC that implements the specified control destination.

For the CONTROL SOURCE GROUP (with which given SOURCE and CONTROL DESTINATION devices are associated) the network manager 4 stores the following data set:—A 32-bit ID that uniquely identifies the specified control source group; a 16-bit value specifying the number of devices belonging to the source group; a 32-bit value specifying the Ids of all of the devices belonging to the group (maximum of ten); a 32-bit value specifying the control destination device associated with the group; a 32-bit source status value specifying the status source device that transmits the status data for each of the (up to ten) devices of the group; 64 bytes comprising tally texts for all of the devices of the group; 128 bytes of description data for storing up to ten descriptions for the group; a 64-byte control source name and an 8-bit status value.

In addition to the above five categories of data sets stored by the network manager 4, the following data is stored by the network manager 4 for each of the ENICs NI1 to NI11 as the ENIC data structure:—a 16-bit ID that uniquely identifies the ENIC; a 48-bit media access control (MAC) address associated with the ENIC; a 32-bit ENIC IP address; a 32-bit IP address for the master clock of the ENIC and a 32-bit filed specifying a number of parameters used for device to hardware mappings.

The ENIC data structure also maps the four source devices of the above example to the physical ports on the ENIC card and includes any hardware limitations that restrict the ideal model described above. When an ENIC initialises it will receive information on what devices are connected to its UDP (RS422) ports, so that the correct driver can be used.

Thus, for each destination group, the network manager 4 stores each multicast IP address MCAST_SRC_IP from which that destination group derives data. It should be understood that different input/output ports of a given destination group may receive data from different IP multicast addresses. The data received depends on the ENIC port (i.e. source/destination device) to which the input/output ports of the destination group (AV device) are connected. As specified above in relation to the DESTINATION data structure, for each destination group an ID for both the destination group itself and for the source group from which the received data is derived is also stored in the network configuration database. The source/destination group ID comprises an identifier of the ENIC by which the source/destination group is connected to the network and an identifier of the EN IC port to which the associated source/destination group is connected. A similar set of information is stored in respect of each source group.

Overview of Switching and Routing Client 6.

In the arrangement of FIG. 1, the switching and routing client 6, similarly to the network manager 4, is a PC linked to the network via a standard network interface card. The switching and routing client 6 is operable to view and/or initiate changes to the network configuration i.e. to initiate of change virtual circuit switched connections between source devices and destination devices. Such changes may be initiated by a user interacting with a GUI as described below with reference to FIGS. 9 to 12. In the example arrangement of FIG. 1, the switching and routing client 6 is operable to control both the video switch D8 and the associated ENIC NI8 as well as the supply of video data to the ENIC NI8 to and from the network. The switching and routing client 6 can also control the supply of video or audio data to other destination devices D2, D3 and D9 via the associated ENICS NI9, NI10 and NI11 respectively. The further switching and routing client 61 is operable to control a different subset of destination devices and their ENICS from those controlled by the switching and routing client 6.

As described above, the network manager 4 maintains a database specifying the current network configuration and co-operates with the switching and routing client 6 to configure the network. Although the network manager 4 can grant the switching and routing client 6 permission to send certain commands directly to the ENIC rather than sending them to the ENIC via the network manager 4, in general, all requests that may jeopardise the network configuration must be sent via the network manager. Examples of particular commands that do not jeopardise the network connections and hence can be sent directly from the switching and routing client 6 to an ENIC are data stream control commands such as play, rewind, fast-forward. Apart from storing information specifying the network configuration, the network controller 4 allocates resources to the ENICs and to the switching and routing clients 6, 61, controls all commands that may jeopardise the audio and/or video data connections on the network and ensures that the switching and routing clients 6, 61 have an accurate view of the relevant network connections.

Figure 2:
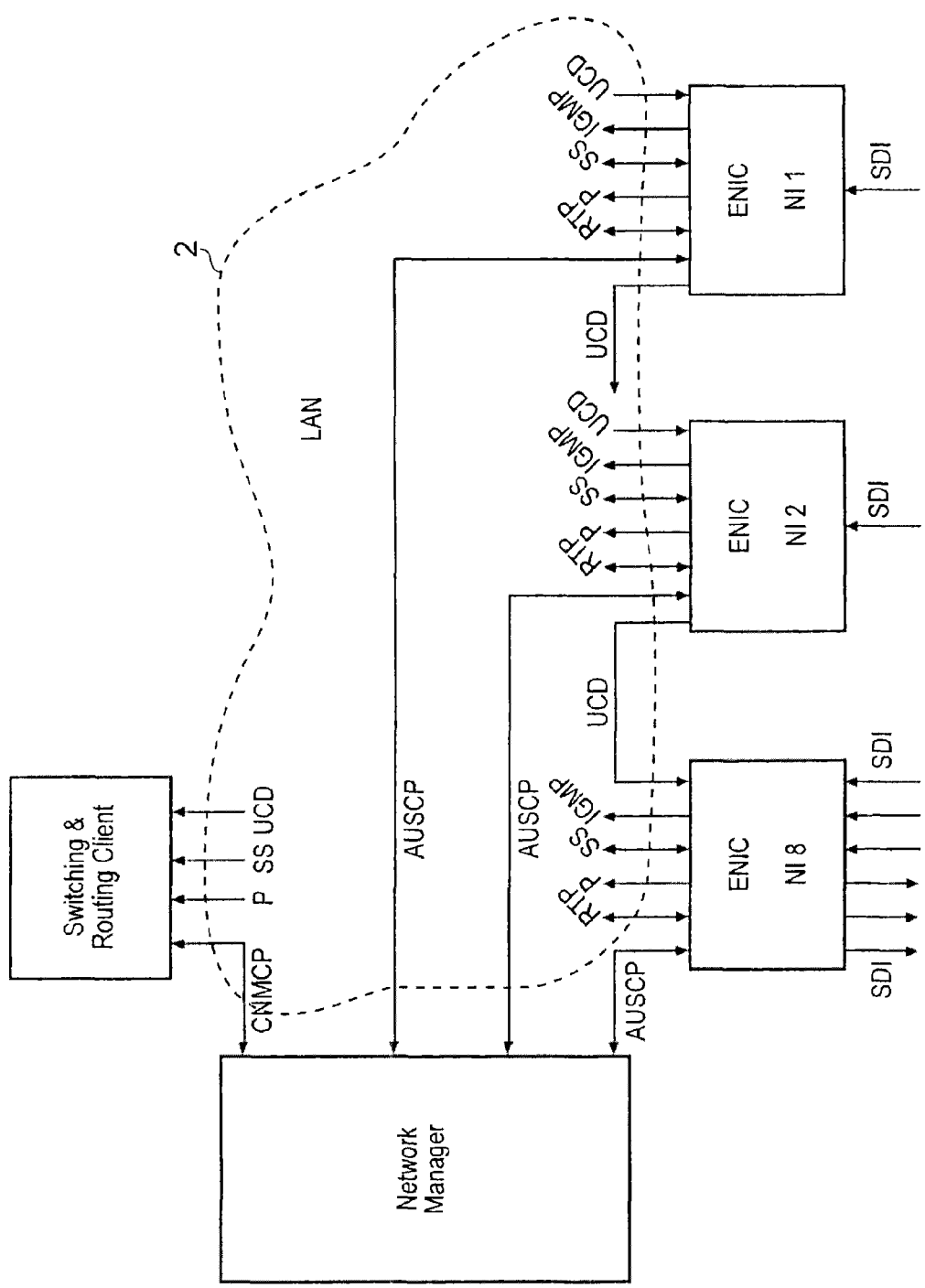
FIG. 2 is a schematic simplified diagram of the network showing data flows across the network.

Protocols and Data Flows, FIG. 2

The Ethernet network of the arrangement of FIG. 1 implements various conventional protocols including UDP (user datagram protocol)/IP, TCP (transmission control protocol)/IP, and IGMP (Internet Group Management Protocol). Other protocols implemented in the network include a known real-time protocol (RTP), and two protocols that are proprietary to Sony Corporation: firstly AVSCP (Audio Video Switching Control Protocol), which is used for connection control between the network manager 4 and the ENICS NI 1 to Nil 1 and secondly CNMCP (Client Network Manager Communication Protocol), which is used for communication between the network manager 4 and the switching and routing clients 6, 61. These protocols will be described in more detail below with reference to FIG. 2.

Referring to FIG. 2, FIG. 2 is a simplified diagram of the network of FIG. 1 showing only the Network manager 4, the switching and routing client 6, and a subset of the ENICs, in particular NI1 (associated with the camera 1 source group), NI2 (associated with both camera 1 and camera 2 source groups) and NI8 (associated with the video switch D8 destination group) by way of example. FIG. 2 illustrates how the network manager 4, switching and routing client 6 and the ENICs NI1, NI2, NI8 communicate via the LAN using a number of different communication protocols. As shown in FIG. 2, the network manager 4 communicates with ENICS NI1, NI2, NI8 using AVSCP whereas the switching and routing client 6 communicates with the network manager 4 using CNMCP. The switching and routing client 6 is operable to receive as input Stream Status (SS) data specifying the status of a CONTROL SOURCE GROUP, to receive AV proxy data P and to output Unicast Control Data (UCD) to the network to control a source or destination device. Note that in this arrangement only the switching and routing client receives proxy video P as input although all three ENICs NI1, NI2, NI8 output proxy video to the network. The ENICs NI1, NI2 and NI8, are each operable to output proxy data P, to receive and transmit SS status data across the LAN, to send and receive RTP communications, to output IGMP data specifying to which multicast group that source device may transmitting data, to receive UCD messages across the network from the switching and routing client 6 and/or network manager 4. Note that the ENIC NI2 is operable to send UCD messages directly to another ENIC NI8 bypassing the network manager 4. As described above, this direct communication between ENICs is only permissible for control commands that do not jeopardise the network connections. Since the ENIC NI8 is associated with the destination group video switch D8 it is operable both to transmit and receive SDI video streams whereas ENICs NI1 and NI2 associated with the cameras are operable only to receive SDI video from outputs on those cameras for packetisation by the ENIC and transmission across the network.

AVSCP

AVSCP uses UDP (User Datagram Protocol) to carry its messages. UDP is a connectionless transport protocol, which means that a one-way data packet is sent by the sending device without notifying the receiving device that the data is en route. On receipt of each data packet, the receiving device does not return status information to the sending device. The data format is described in the section "Data Format" and FIG. 3B below.

AVSCP is used for communication between the network manager and each ENIC for the purpose of connection control and in order to monitor the operation status of ENIC and AV (audio and video) ports. For example, if it is desired to connect a video tape recorder (VTR) destination device to a camera source device to receive AV data then the switching and routing client 6 must send an instruction to the ENIC associated with the destination device, in this case the VTR, to join the port of that ENIC that is connected to the VTR to the specific multicast group that is sourced from the camera. This instruction between the ENIC and the switching control server 6 is sent via the AVSCP protocol.

The AVSCP protocol messages have five main functions, which are to:

1) Monitor the operational status of the ENICs;
2) Discover the configuration of an ENIC;
3) Stop and start audio and video source transmission;
4) Direct ENICs and their associated audio and video devices to join multicast groups; and
5) Set up and delete paths for conveying control data across the network.

The network manager 4 should be aware of the operational status of an ENIC before it can send any instructions to it. Accordingly the AVSCP protocol requires an ENIC to send status messages to the network manager 4 periodically. The network manager 4 can only control AV stream transmission and reception of an ENIC when it is operational. As an alternative to deriving network configuration information from messages periodically generated by the ENICs, the network manager 4 can actively obtain the current configuration of an ENIC by sending a configuration request message to it. The ENIC responds to this request by returning a message specifying the current configuration.

Examples of AVSCP messages are as follows:

STOP_TX and START_TX:—these are command messages that allow the network manager 4 to instruct an ENIC to stop transmission and start transmission of a specific AV data stream (specified by AV input port of ENIC).

SWITCH_AV and SWITCH_AUDIO:—these are command messages that enable the network manager 4 to instruct an ENIC to add or delete an AV data stream or audio data stream respectively to a specific multicast group SET_CTRL_TX and SET_CTRL_RX:—these are command messages to set up transmit (TX) and receive (RX) ends of an AV data stream control path. If an application sends a SET_CTRL_TX message to one ENIC then it will typically also send a SET_CTRL_RX message to the ENIC at the other end of the control path to create a complete AV control path.

UPDATE_TALLY:—this is a command message used to request a source/destination device associated with an ENIC port to update its display of tally text information. This command is usually used when an AV source changes its display information.

ACK:—this message is sent by an ENIC to the network manager 4 when it has received a command message from the network manager 4. The acknowledged command message is identified by a session ID value and the acknowledgement itself could be either positive or negative. The ACK message of AVSCP is required because UDP is not a guaranteed delivery protocol. If messages are not acknowledged within a predetermined time then they may be retransmitted up to a maximum number of times by the network manager.

Figure 14:
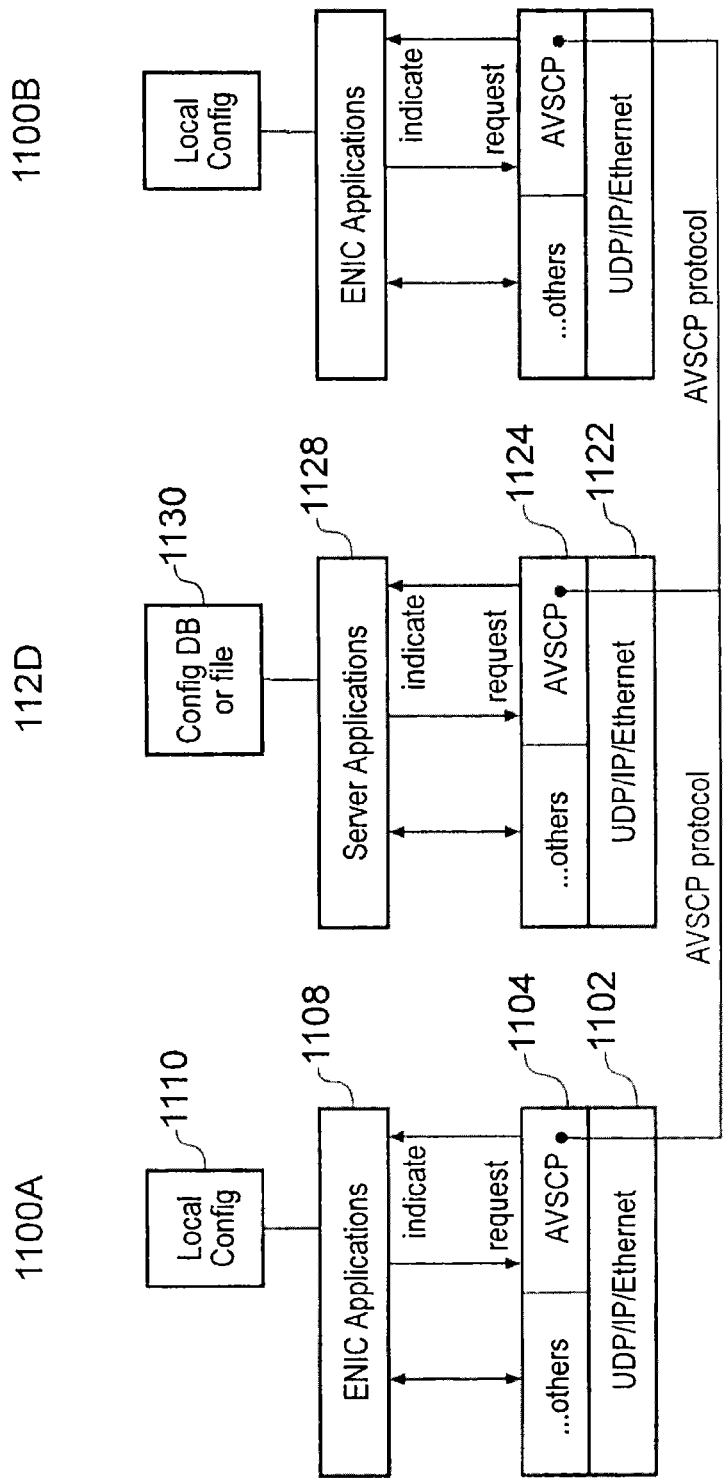
FIG. 14 schematically illustrates a protocol stack.

FIG. 14 schematically illustrates how AVSCP relates to other functional modules in the ENIC network of FIG. 1. The arrangement of FIG. 14 shows identical protocol stacks 1100A and 1100B of two different ENICs and a protocol stack 1120 of the network manager 4. The ENIC protocol stack comprises an AVSCP layer 1104 that sits on top of a UDP/IP/Ethernet layer 1102. Other protocols 1106 may also be implemented at the same level of the protocol stack as AVSCP. The AVSCP layer communicates with a higher layer 1108 comprising ENIC applications via an AVSC request command and an AVSC indicate command. An uppermost layer of the ENIC protocol stack 1100A represents a local configuration 1110 of the network. The network manager protocol stack 1120 is similar to the ENIC protocol stack 1100A, 1100B in that it comprises an AVSCP layer 1124 that sits on top of a UDP/IP/Ethernet layer 1122. However, a server applications layer 1128 sits on top of the AVSCP layer 1124 and communications between these two layers are mediated by the AVSC request command and the AVSC indicate command. The server applications layer 1128 is in communication with a higher layer corresponding to a network configuration database 1130. The AVSCP protocol layer 1104 of the ENIC may send AVSCP protocol messages to and receive messages from the corresponding AVSCP protocol layer 1124 of the network manager 4.

The AVSCP request is a primitive command that is sent from the application layer of the ENIC 1108, or network manager 1128 to the corresponding AVSCP protocol layer 1104, 1124. An application initiates an AVSCP request in order to send an AVSCP message to another AVSCP entity. The AVSCP request has the following parameters: IP address of the message destination (typically an ENIC); AVSCP message type (e.g. stop transmission, switch etc.); and a number of information elements required by the message.

One or more remote client controller devices (not shown) may access the server applications layer 1120 of the network manager 4 via a client controller interface (not shown). The client controller interface of the network manager 4 enables a client controller to connect remotely with and exercise a subset of control functions over a subset of ENIC devices.

Figure 15:
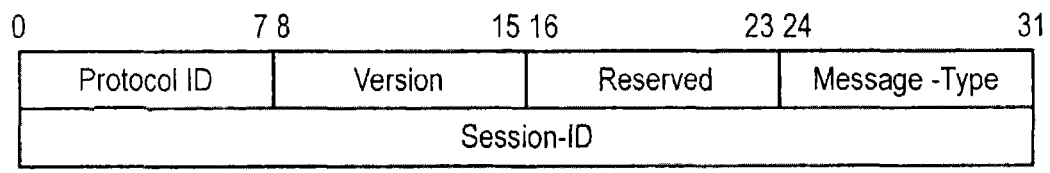
FIG. 15 schematically illustrates an AVSCP header.

FIG. 15 schematically illustrates the structure of an AVSCP header that is applied to all AVSCP messages. The AVSCP header has a fixed length of 32 bits. The first octet (bits 0 to 7) is used as a protocol identifier. It has a value of 0xCC. The purpose of a protocol ID is to detect possible collision with other protocols if they happen to use the same port number. The second octet (bits 8 to 15) is used to carry a version number for the protocol. The third octet (bits 16 to 23) is reserved for future use. The fourth octet (bits 24 to 31) indicates the message type. The last 4 octets of the AVSCP header is a session-ID, which is a random number chosen by the command message initiator to tie up acknowledgement message returned by the responder to the original command message.

CNMCP

As described above, the network manager 4 and the switching and routing client 6 communicate with each other using CNMCP. CNMCP messages are carried by TCP (See section "Data Format" and FIG. 3B for a description of the data format TCP is a connection-oriented protocol, which means that before any data is transferred between network nodes, the sending and receiving devices must co-operate in the establishment of a bi-directional communication channel. Subsequently, each package of data sent across the local network receives an acknowledgement and the sending device records status information to ensure that each data package is received without errors.

CNMCP enables control messages such as a registration request, a switch request or a permissions update from the switching and routing client 6 to the network manager 4 and further enables control messages such as a registration response, a switch response, an update indication (specifying device configurations) and a permission response from the network manager 4 to the switching and routing client 6. By sending CNMCP messages to the switching and routing client 6, the network manager 4 informs the switching and routing client 6 of data associated with the ENICs which are connected to the network as well as data associated with source devices and destination devices connected to the network by the ENICs. Furthermore, by sending CNMCP messages from the network manager 4 to the switching and routing client 6, the network manager 4 informs the switching and routing client 6 of the multicast IP addresses on which it can receive the proxy video streams, audio streams and status streams. The network manager 4 can determine whether sufficient bandwidth is available to service a request by the switching and routing client 6 to add a connection between a source device and a destination device and mediates access to network resources accordingly. However, it is also possible for the switching and routing client 6 to enable an ENIC source/destination device to join a multicast group directly without requesting access via the network manager 4. This may be appropriate where, for example, only a low data-rate connection is required.

Alternatively to CNMCP, a known protocol such as Simple Network Management Protocol (SNMP) may be used. The switching and routing client 6 can cause the network to connect audio and video streams from source devices to destination devices, both of which are specified by the switching and routing client 6 and to specify control data routing by sending CNMCP or SNMP messages to the network manager 4.

Audio and Video Data (RTP)

For sending streams of audio and video data from the source devices to the destination devices, the transport layer is UDP multicast. The audio and video data are carried in Real-Time Protocol (RTP) format within a UDP packet. This applies to the audio data, the full resolution video and the low resolution proxy video. (See section "Data Format" and FIG. 3A below for a description of the data format). RTP provides functions to support real-time traffic, that is, traffic that requires time-sensitive reproduction at the destination application. The services provided by RTP include payload type identification (e.g. video traffic), sequence numbering, time-stamping and delivery monitoring. RTP supports data transfer to multiple destinations via multicast distribution if provided by the underlying network. The RTP sequence numbers allow the receiver to reconstruct the original packet sequence. The sequence numbers may also be used to determine the proper location of a packet. RTP does not provide any mechanism to ensure timely delivery, nor does it provide other Quality of Service guarantees.

When an ENIC receives an AVSCP switch request from the network manager 4, the ENIC sends an IGMP join message to the Ethernet switch 2 to join the multicast group of the data it needs to receive.

Unicast Control Data (UCD)

Control data may be sent, only as a Unicast transmission, directly from one ENIC to another. In the case of control data that is likely to jeopardise virtual circuit-switched connections on the network the control data must be sent via the switching and routing client 6 and/or the network manager 4 to control a device. However, for a specific subset of control data a controller connected to one ENIC may directly control a device connected to another ENIC bypassing the network manager 4 and the switching and routing client 6. For example, commands such as play, pause stop, record, jog etc. may be sent from a controller across the network directly to a source/destination group such as a VTR. The control channels are set up using AVSCP. The control data itself is carried in UDP messages in this embodiment. However, TCP may alternatively be used to carry control data.

Stream Status (SS)

Since status data is likely to be low-bandwidth, CNMCP is used to enable the switching and routing client 6 client to receive the status information SS without the intervention of the network manager. Where a controller is connected to the network at a first ENIC and controlling a group is connected to the network via a second, EN][C the first ENIC needs to know the status of the controlled group. To achieve this, status data SS may be sent from the controlled group to the controller via the network. The switching and routing client 6 is operable to elect to receive SS data to monitor the current status of the data stream.

AV Proxy Streams (P)

AV proxy streams are communicated across the network using RTP over UDP multicast. The switching and routing client 6 can elect to receive proxy video for monitoring purposes and to make informed switching decisions with regard to the virtual circuit-switched connections. In the arrangement of FIG. 2 only the switching and routing client 6 receives the proxy video stream but ENICs NI1 (associated with 'Camera 1' S1 source group), NI2 (associated with 'Camera 2' S2 source group) and NI8 (associated with video switch D8 destination group) are all operable to output proxy video data streams. Users of source group and destination group devices such as cameras, VTRs and video processors are likely to want to make editing decisions based on the content of the audio and/or video data streams and it is for this reason that AV proxy streams are generated. Although several known video formats stream video data across a network using RTP, these known methods involve heavy compression of the video data. Video compression methods that introduce significant periods (i.e. >one field) of delay are unsuitable for the studio production environment in which the network according to the present technique is likely to be deployed. Furthermore, in a production environment it is likely that multiple AV data sources will have to be displayed substantially simultaneously on a screen and this would place undue burden on the data processor to decompress the multiple data streams, perhaps requiring hardware acceleration. Accordingly, the video proxy is generated as an uncompressed sub-sampled data stream rather than a compressed data stream ((e.g. QCIF (176×144); 16 bit RGB; 25 frames per second; sub-sampling with horizontal and vertical filtering; at 15.2 Mbits per second).

Data Formats—FIGS. 3A, 3B, 3C.

Audio and Video Data

Referring to FIG. 3A, the audio and video data format comprises, in order, an Ethernet header, an IP multicast header, a UDP header, an RTP header, a field specifying the type of payload, the payload, and a CRC (cyclic redundancy check) field. The Ethernet header comprises a source Ethernet address and a destination multicast Ethernet address. The IP multicast header comprises the source ENIC IP address and the destination device multicast IP address. There are several different IP address classes e.g. Class A has the first 8-bits allocated to the network ID and the remaining 24-bits to the host ID whereas Class B has the first 16 bits allocated to the network ID and the remaining 16-bits to the host ID.

Class D IP addresses are used for multicasting. The four left-most bits of a Class D network address always start with the binary pattern 1110, corresponding to decimal numbers 224 to 239, and the remaining 28 bits are allocated to a multicast group ID. IGMP is used in conjunction with multi-casting and Class D IP addresses.

The set of hosts (i.e. source and/or destination devices) listening to a particular IP multicast address is called a host group. A host group may span multiple networks and membership of a host group is dynamic. The Class D IP address is mapped to the Ethernet address such that the low-order 23 bits (of 28) of the multicast group ID are copied to the low-order 23 bits of the Ethernet address. Accordingly 5 bits of the multicast group ID are not used to form the Ethernet address. As a consequence the mapping between the IP multicast address and the Ethernet address is non-unique i.e. 32 different multicast group IDs map to the same Ethernet address.

The UDP header comprises source and destination port numbers, which are typically associated with a particular application on a destination device. Note that UDP is redundant in the case of multicast messages since in this case the multicast group address identifies the stream/content. The audio/video streams are transported using RTP protocol. Forward Error Correction (FEC) may be used for certain data streams e.g. full resolution video streams to provide a level of protection against data corruption due to network errors. FEC is provided using a known RTP payload format that provides for FEC. FEC is a parity-based error protection scheme.

A known extension to the RTP protocol allows a video scan line number to be specified in the RTP payload header. The RTP header also comprises a field to specify whether 8-bit or 10-bit video is present. Although known RTP and RTP/FEC protocol formats provide the data packet fields necessary to transport audio and video data over an IP network it may also be desired to transmit additional information such as source status and source timecode information. For example if the source device is a VTR then the timecode as stored on the tape should be transferred across the network. The source status information might indicate, for example, whether the VTR is currently playing, stopped or in jog/shuttle mode. This status information allows a user to operate the VTR from a remote network location. Since the timecode data and source status information is required only once per field, the information is transported in an RTP packet marked as vertical blanking. To allow audio and video resynchronisation, the RTP timecode is based on a 27 MHz clock. The payload type field contains data indicating the type of payload. i.e. video or audio data. The payload field contains the video or audio data to be transmitted. The CRC is a cyclic redundancy check known in the art.

AVSCP and CNMCP

AVSCP and CNMCP messages are carried by a data format as shown in FIG. 3B. The format comprises in order, an Ethernet header, an IP header (which is not a multicast header), a UDP or TCP header, the payload, and a CRC field. The Ethernet header comprises source and destination Ethernet addresses. The IP header comprises the source ENIC IP address and the destination ENIC IP address. UDP is used for AVSCP and TCP is used for CNMCP. The payload field contains the AVSCP or CNMCP message data. The CRC is a cyclic redundancy check known in the art.

Stream Status Format

The stream status (SS) format is identical to the audio and video data format as shown in FIG. 3A, with the exception of the content of the payload section. The frame comprises an Ethernet header, an IP multicast header, a UDP header, an RTP header, a payload type identifier, a stream status data payload and a CRC field.

Unicast Control Data Format

The unicast control data format is shown in FIG. 3C and comprises an Ethernet header, a standard IP header (not multicast), a UDP header, a payload section assigned to 30 unicast control data and a CRC field.

IGMP is a known protocol. Multicasting that extends beyond a single network is complicated by the fact that Internet routers must establish whether any hosts (in this case source devices and destination devices) on a given physical network belong to a given multicast group. IGMP is typically used to establish this information. IGMP lets all nodes of a physical network know the current association of hosts to multicast groups. IGMP messages are transmitted in IP datagrams and have a fixed 8-byte IGMP message size concatenated with a 20 byte IP header. The IGMP message includes a 32-bit Class D IP address.

A number of IGMP queries and reports are used by multicast routers (e.g. the Ethernet switch 2 of FIG. 1) to record which network interfaces have at least one host (source/destination device or group) associated with a multicast group. When the Ethernet switch 2 receives a multicast message from a source device to forward, it forwards the message only to interfaces that currently have destination devices associated with that multicast group.

ENIC, FIG. 4

An ENIC joins a multicast group by sending an IGMP join message to the asynchronous Ethernet switch 2. An ENIC may send and/or receive data in the audio/video format shown in FIG. 3A, in the AVSCP/CNMCP format shown in FIG. 3B or in the UCD data format shown in FIG. 3C. Note that an ENIC does not send or receive CNMCP data (which only passes between the network manager 4 and the switching and routing client 6).

Figure 4:
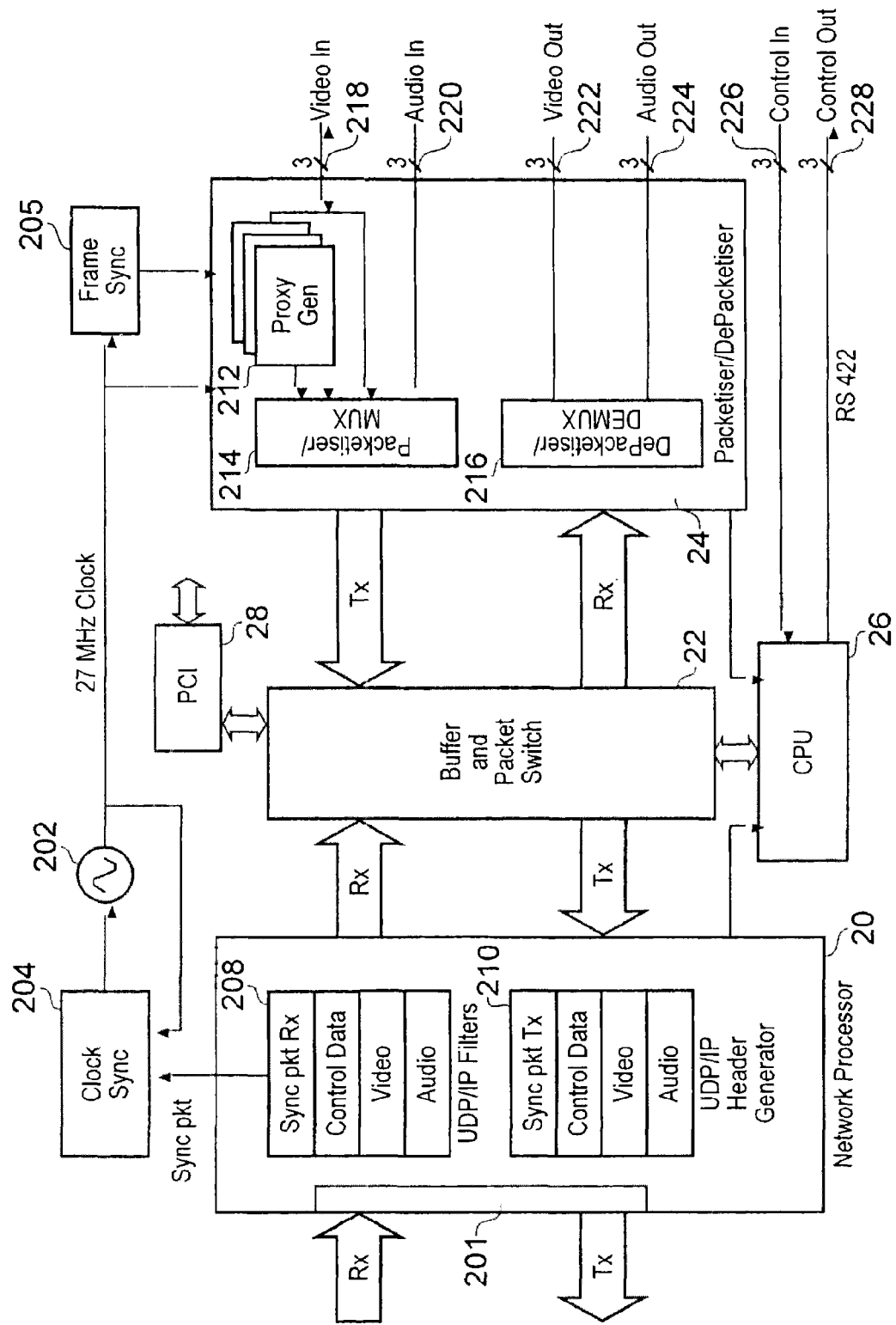
FIG. 4 is a schematic block diagram of a network interface of the network of FIG. 1.

Referring to FIG. 4, an ENIC comprises a network processor 20, a buffer and packet switch 22, a packetiser/depacketiser 24, a control processor CPU 26, a peripheral component interconnect PCI 28, a clock 202, a clock synchronisation circuit 204 and a frame synchronisation circuit 205. The clock synchronisation circuit 204 is described in co-pending UK patent Application 0204242.2. The frame synchronisation circuit is described in co-pending patent application 0307459.8.

The packetiser/depacketiser has three video inputs 218 for receiving respective SDI video streams, three audio inputs 220 for receiving respective SDI audio streams. Alternatively, three input ports could be provided for receiving combined SDI audio/video streams and the audio and video streams could be subsequently separated to form three audio and three video streams with in the ENIC. In further alternative embodiments AES digital audio streams could be supplied as input to the packetiser/depacketiser. The packetiser/depacketiser 24 has likewise three video outputs 222 and three audio outputs 224.

The CPU 26 has three control data inputs 226 and three control data outputs 228, here denoted "RS422" because they provide control similar to that provided by RS422 in a conventional studio. The three video inputs 218 are connected to respective ones of three substantially real-time proxy video generators 212 which generate the low resolution versions of the video streams as will be described below. The outputs of the proxy generators and the SDI video inputs 218 are supplied as input to a packetiser and multiplexer 214, which converts the full resolution serial video from the inputs 218 and the proxy video from the proxy generators 212 to packets suitable for transmission across the network. The packets are then supplied to the buffer and packet switch 22. The packetiser/depacketiser 24 has a depacketiser 216 and demultiplexer for receiving packets representing the SDI video and audio channels from the packet switch 22. It depacketises and demultiplexes the video and audio into 3 serial video streams and 3 serial audio streams for supply to respective ones of three video outputs 222 and three audio outputs 224. Thus the packetiser/depacketiser 24 provides routing of the video and audio received from the network in packetised form via the packet switch 22 to outputs 222 and 224 in serial digital format and further provides the routing of the serial digital video and audio data received from source devices via the inputs 218,220 to the buffer and switch 22 for transmission in packetised form across the network. The packetiser/depacketiser 24 also provides synchronisation of the different video and audio streams in conjunction with the clock synchronisation circuit 204 and provides frame alignment of the video frames of the different video streams in conjunction with the frame synchronisation circuit 205.

The buffer and packet switch 22 provides routing of video, audio and control packets received from the network processor 20 in accordance with a series of tags, which are applied to the packets in the network processor 20. The network processor 20 generates the tags in accordance with header data in the received packets. There are two sorts of tag: a "flow" tag, which defines the route of the data through the packet switch 22, and a "type" tag, which defines the final output to which the packets are supplied by the packetiser/depacketiser 24. The video and audio packets are routed to the depacketiser 216, whereas the control packets are routed to the CPU 26.

The network processor 20 comprises UDP/IP filters 208, which detect, using packet header information, sync, audio, video, status and control data packets received from the network. Received clock sync packets are directed by the network processor 20 directly to the clock synchronisation circuit 204 to synchronise the ENIC clock 202 with a master reference clock as described in the co-pending UK patent application 0204242.2. Frame sync packets are directed by the network processor 20 to the clock sync circuit 204 and then to the frame sync circuit 205 via the ENIC clock 202. The network processor 20 directs the sync packets directly to the clock synchronisation circuit 204 and to the frame synchronisation circuit 205 to reduce time delays which may otherwise reduce the accuracy of the synchronisation. Other packets, for example AVSCP packets, which are not recognised by the filters 208 are directed to the CPU 26 (although in alternative arrangements) filters could be set up for these.

The network processor 20 attaches tags to the audio and video packets in accordance with the header data received with them. The tagged video and audio packets are supplied to the packet switch 22, which routes them to the depacketiser 216 or to the PCI 28 computer interface. The tagged control data packets are directed by the buffer and packet switch 22 to the CPU 26. The buffer and packet switch 22 is described in more detail below.

Routing Data in an ENIC
1. Data Received from the Network

An ENIC may receive from the network: audio and video data packets as shown in FIG. 3A; AVSCP data packets as shown in FIG. 3B; stream status data packets (in essentially the same format as shown in FIG. 3A); and unicast control data packets as shown in FIG. 3C. The Ethernet header provides the physical address of the ENIC allowing a packet to be delivered by the network in known manner to the ENIC.

The network processor 20 of the ENIC (see FIG. 4) has the UDP/IP filters 208 that extract the IP and UDP headers, decode the address information in the headers and detect the payload data type from the payload type field (see FIG. 3A). The network processor 20 then replaces the packet header with a tag identifier, which specifies a data processing route through the ENIC for the packet payload data to a target data handling node such as a video or audio processor. FIG. 5A schematically illustrates the data format of a tagged packet. The tagged data packet is 32 bits wide and is of indefinite length i.e. the payload has a variable length. The first 32 bits of the tagged packet comprise an 8-bit "flow" data field, an 8-bit "type" data field and a 16-bit "size" field. The next 32 bits are currently unused. The unused field is followed by a payload field. For audio and video data the tagged packet payload comprises the RTP header and the payload type data in addition to the audio or video data payload of FIG. 3A. In the case of both AVSCP/CNMCP data packets and unicast control data packets (see FIGS. 3B and 3C) the tagged packet payload is the message data.

The flow data field of the tagged packet data format of FIG. 5A defines the output of the packet switch 22 (FIG. 4) corresponding to the target data-handling node for which the tagged packet payload is destined. The type data field determines what the target processor does with the data and the size data field specifies the payload size.

Figure 5B:
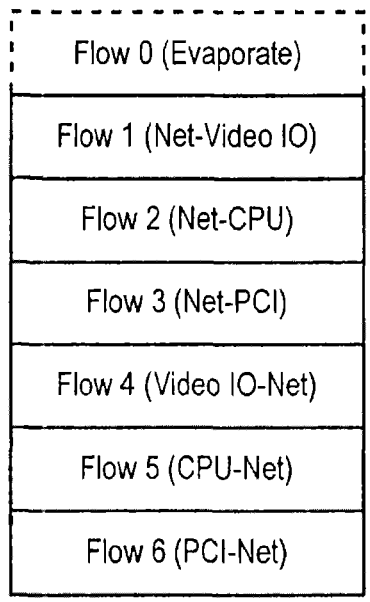
FIG. 5B is a schematic example of current flow assignment.
Figure 5A:
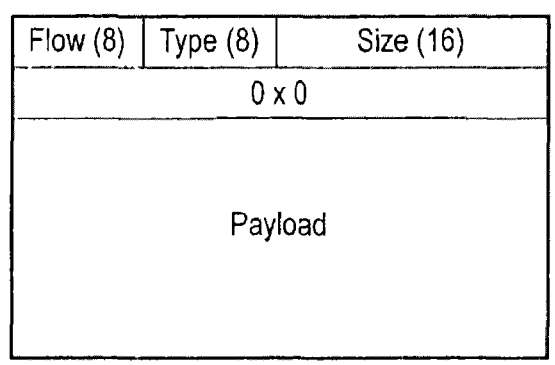
FIG. 5A is a schematic diagram of the format of an data packet used in the network interface.

FIG. 5B schematically illustrates an example of a flow assignment allocation. In this example flow 0 corresponds to data that will not be passed to any target processing device e.g. untagged data; flows 1 and 4 correspond to video input and output ports 218, 222 of the packetiser/depacketiser 24 (see FIG. 4); flows 2 and 5 correspond to CPU data flows from and to the network; and flows 3 and 6 correspond to PCI 28 data flow from and to the network.

Figure 5C:
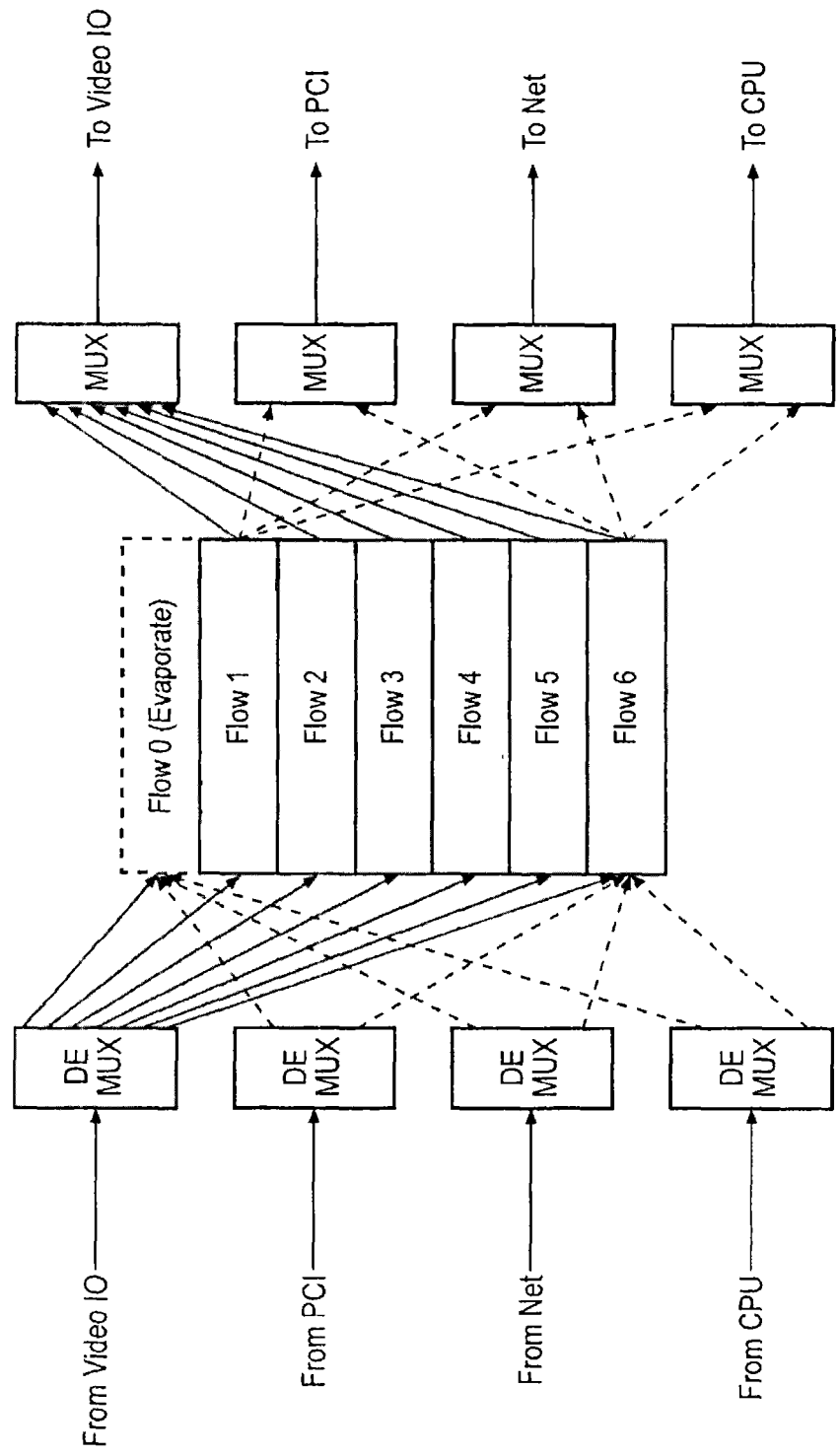
FIG. 5C schematically illustrates data flow in an ENIC.

FIG. 5C schematically illustrates how video data, PCI data, network data and CPU data is mapped to each of the six defined flow paths via multiplexers (MUX) and demultiplexers (DEMUX). Each of the data flows of FIG. 5B is associated with a FIFO. In this example arrangement there is no direct means of determining the size or number of packets written to the FIFO since this is not necessary. The tags associated with the packets specify the packet size so the MUX only requires a "not empty" indication for the FIFO to perform a read operation. The MUX modules are programmable (by external means such as a CPU) such that they are sensitive only to particular flows. This enables virtual flow paths to be set up across the buffer and packet switch 22 of FIG. 4. Similarly, to avoid contention, only a single DEMUX module can write into any one data flow. Again, the mapping is programmably controlled by external means.

Figure 6A:
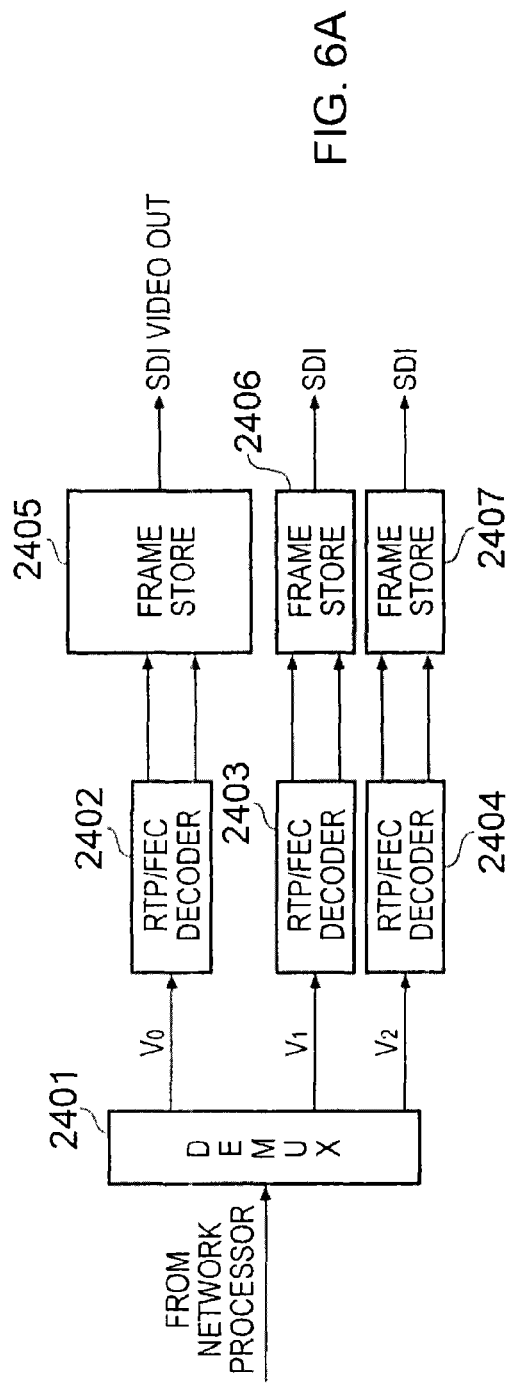
FIGS. 6A and 6B schematically illustrate a packetiser/depacketiser switch of the network interface.

Referring to FIG. 6A, the video section of the packetiser/depacketiser 24 is shown. It comprises a demultiplexer 2401 which responds to the "type" data in the tags attached to the video packets to feed video packets to three channels V0, V1 and V2 denoted by the type data. Each channel comprises an RTP/FEC decoder 2402, 2403, 2404 followed by a respective frame store 2405, 2406, 2407. The RTP decoder 2402 removes the tag from the packet it receives and writes the packet into the frame store at the address defined by the RTP packet header, in particular the line number data thereof, to create a video frame having the video data in the correct order.

First Example of Operation

Multicasting of Audio Data

In this example, it is desired to form a data communication path to transmit AES audio data from source group S9 across the network to the audio processors D3. The AES audio data is to be packetised by ENIC NI6, sent across the network and received and depacketised by ENIC NI10 before being delivered in serial digital format to the audio processors D3. The user may instigate the connection between audio source S9 and the audio processors by interacting with the GUI described with reference to FIGS. 9 to 11 and displayed by the switching and routing client 6.

To set up the communication paths between audio source group S9 and audio processors D3, the switching and routing client 6 sends a CNMCP switch request message to a predetermined port of the network manager 4 to initiate a change to the current configuration of virtual circuit-switched connections. The network manager 4 sends CNMCP messages to the switching and routing client 6 providing information on the source devices and destination devices (and the associated source groups and destination groups) that are available to it. This enables the switching and routing client 6 to derive a view specifying the current configuration and status of the network. Each source device and destination device has an associated ID assigned by the network manager in communications to the switching and routing client 6 and this device ID is used by the switching and routing client 6 in subsequent communications with the network manager. In response to a user request to connect S9 to D3 the switching and routing client 6 send a CNMCP message device to the network manager 4 containing the ID of the relevant source device and the ID of the destination.

In the event that the switching and routing client 6 is not permitted to perform this operation (e.g. if there is insufficient network bandwidth available to form a reliable connection) then the network manager 4 sends a NACK (negative acknowledgement) CNMCP message to the switching and routing client 6 in response to the connection request. On the other hand, if the network manager 4 permits establishment of the connection, the connection request will be processed as follows.

First, the network manager 4 queries its network configuration database to determine which multicast IP address the AES audio data from source group S9 is currently being transmitted to. Then an AVSCP switch message containing the multicast IP address to which S9 transmits is created by the network manager 4 and sent to the relevant port (device) of the ENIC NI10, which connects the audio processors D3 to the network. Embedded software on the ENIC NI10 sends an IGMP join message to the multicast IP address on which the audio data of S9 is transmitted and then sends an AVSCP ACK message back to the network manager. This enables the ENIC NI10 to receive the output of the audio source S9 on one of its destination devices and the ENIC NI9 will route the received audio data to the source device (ENIC AES output port) that connects to the audio processors D3. Meanwhile, the network manager 4, having received the AVSCP ACK message from the ENIC NI10 acknowledging that the instruction to join the specified multicast IP address has been received, will update the routing information in the network configuration database to reflect the existence of the newly formed connection. Finally, the network manager 4 sends a CNMCP ACK message to the switching and routing client 6 indicating that the requested audio data connection between S9 and D3 has been successfully set up.

Second Example of Operation

Multicasting of AV Data

In this example of operation, two of the source groups of FIG. 1 are connected to a single destination group. In particular, the outputs of 'Camera 1' S1 and 'Camera 2' S2 are supplied as inputs to the video switch D8. To initiate connections between S1 and D8 and between S2 and D8, the switching and routing client 6 sends CNMCP switch messages to the network manager 4 containing the ID values associated with 'Camera 1' 51, 'Camera 2' S2 and the video switch D8.

Recall that the network configuration database of the network manager 4 also stores data in relation to each ENIC device category. In particular, the network configuration database stores data indicating whether each source device is linked, the number of video lines to delay transmission of the data stream by and the current transmission status the source device. The network manager 4 also derives information with regard to the destination devices from the database, including the IP address of the ENIC that implements the device and the number of video lines to delay playout by.

From the network configuration database the network manager 4 can determine the multicast IP address that each of the camera source groups S1, S2 transmits data to. Thus to establish the connections between the two cameras 51, S2 and the video switch D8 the network manager 4 transmits AVSCP messages to the ENIC NI8 specifying both the multicast IP address onto which 'Camera 1' transmits AV data and the multicast IP address onto which 'Camera 2' transmits AV data. Each of the AVSCP message from the network manager 4 is detected by the network processor 20 (FIG. 4) of the ENIC NI8 and fed to the CPU 26 of the ENIC NI8 which issues an IGMP join message to the network. The AV packets output by each of the two cameras are received by the network processor 20 of the ENIC NI8. Each of the received video packets specifies, in its header data, a destination IP address and the multicast group for which that AV packet is destined is derived from the IP address. The ENIC NI8 determines from the multicast group, to which output port (source device) of the ENIC NI8, the depacketised AV data should be routed. As explained above the multicast group determines to which subset of destination devices in the network a data packet should be routed. In the ENIC NI8, the headers are removed from the AV packets by the network processor 20 and replaced by the tags (as described above with reference to FIG. 4). The packet switch 22 routes the video packets to the demultiplexer 2401 (see FIG. 6A) according to the flow data in the tag. The demultiplexer 2401 depacketises that data and routes it to RTP/FEC decoders 2402 and 2403 (by way of example) where decoding is performed and video frames are reconstructed. The output from the decoders 2402 and 2403 is subsequently supplied to frame stores 2405 and 2406 respectively. In addition, the frame sync circuit 205 of the ENIC NI8 (see FIG. 4) aligns the frames of the two video streams, taking into account the line delay information stored in the network configuration database by the network manager 4. The video switch D8 (FIG. 1) receives the two AV SDI streams from the ENIC NI8.

In addition to setting up data communication channels between 'Camera 1', 'Camera 2' and the video switch D8, it is also necessary to set up control channels, which are specified by the CONTROL_SOURCE and CONTROL_DESTINATION data structures in the network configuration database. An AV stream control path is set up sending two 'CREATE_STREAM_CTRL' AVSCP messages from the switching and control server 6 to the two ENICs defining the end points of the control path. Each 'CREATE_STREAM_CTRL' sets up one end of the control path at an ENIC. Once the control path has been established, UCD data packets can be sent to the ENIC, NI8, for example, to instruct the video switch D8 to change its output from data sourced from 'Camera 1' to data sourced from 'Camera 2'.

Accordingly, in addition to the AV data streams from 'Camera 1' and 'Camera 2', the video switch D8 also receives control data from the CPU 26 (FIG. 4) of the ENIC NI8. The control data is sent by the switching and routing client 6 (FIG. 1) as Unicast control data, which is received via the network in packetised form by the network processor 20 (FIG. 4) of ENIC NI8. The Unicast control data has a header that identifies it as a control packet and accordingly (as described above with reference to FIG. 4), these control packets are routed to the CPU 26 of the ENIC NI8. The control data may instruct the video switcher D8 to switch its output from one of the AV streams to the other i.e. from 'Camera 1' to 'Camera 2'.

Third Example of Operation

Propagation of Changes to Tally Text Data through the Network

Figure 7:
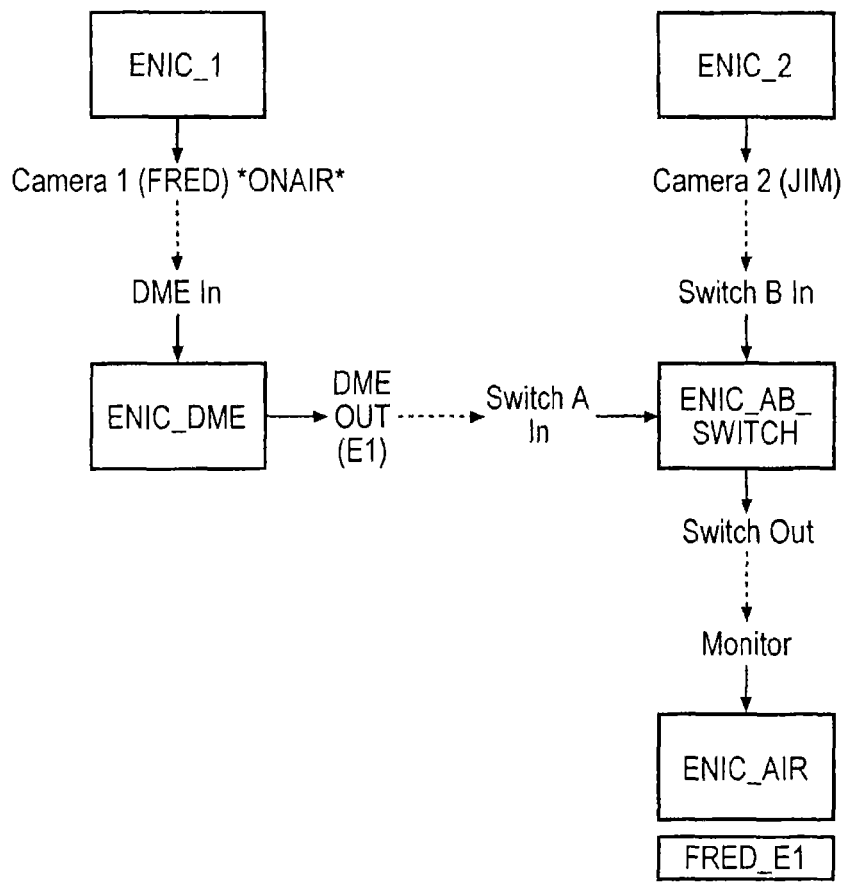
FIG. 7 is a schematic block diagram of an illustrative small network for explaining a mode of operation of the network.

FIG. 7 schematically illustrates a simplified view of a network arrangement according to the present technique. The network comprises two cameras, "camera 1" and "camera 2", a Digital Multi-Effects (DME) unit, an AB switch and a monitor that may display the output AV stream of one or other of the two cameras, depending on the current configuration of the AB switch. FIG. 7 illustrates the network in terms of the ENICs associated with each of the network devices. Accordingly, the network comprises ENIC_1 710 that is connected to a source device of "camera 1", ENIC_2 720 that is connected to a source device of "camera 2", ENIC_DME 730 that is connected to the DME unit, ENIC_AB_SWITCH 740 that is connected to the AB switch and ENIC AIR 750 that is connected to the monitor.

The ENIC_1 710 receives SDI data output by "camera 1", packetises it, transmits it across the network via the ENIC_DME 730 to the DME for digital multi-effects processing and the SDI output of the DME is supplied back to ENIC_DME 730 for packetisation and transmission across the network to the AB switch via ENIC_AB_SWITCH 740. The output of "camera 2" is packetised by ENIC_2 720 and transmitted in packetised form across the network to the AB switch via ENIC_AB_SWITCH 740. Depending on the current configuration of the AB switch, either the DME processed output of "camera 1" or the output of "camera 2" is supplied to the ENIC_AIR 750 for conversion to SDI format and for display on the monitor. The broken lines between the ENICs in FIG. 7 represent a network connection from an ENIC whereas the unbroken lines represent an SDI connection to an ENIC. Recall that SDI data is supplied input to an ENIC port for packetisation and transmission across the network to a destination device whereas packetised data received from the network by an ENIC is depacketised and supplied to an AV device as a serial digital data stream such as an SDI data stream or AES audio data stream.

Recall that the network configuration data stored by the network manager 4 includes a "SOURCE" data structure that includes the parameter "LINK" and that a source having LINK=1 is a source that is supplied by a destination device. The video source device for each camera has LINK=0 and so is a 'pure' source i.e. it directly generates the data that it outputs. Each camera has a user group called "Producer" and the Producer has set the tally text to be the name of the cameraman, i.e. "FRED" or "JIM" for "camera 1" and "camera 2" respectively. ENIC_1 710 is associated with "camera 1", ENIC_2 is associated with "camera 2" and the three other ENICs on the network are ENIC_DME 730, ENIC_AB_SWITCH 740 and ENIC_AIR 750. ENIC_DME 730 performs digital multi-effects (DME) on the video from "camera 1". This ENIC will have two device entries in the network configuration database stored by the network manager 4, the device entries being labelled DME In' and 'DME Out'. 'DME In' is a destination device, which receives across the network, packetised data from "camera 1" for supply to the DME unit and has a video link to the source device 'DME Out' on the same ENIC, via which packetised DME-processed data from "camera 1" is transmitted across the network to the ENIC_AB_SWITCH 740. 'DME Out' also has a tally entry of E1 (indicating EFFECT 1). ENIC_AB_SWITCH 740 performs a seamless switch between the "DME Out" source device and the source device associated with ENIC 2 720 that outputs data from "camera 2". This ENIC 740 will have three device entries in the network configuration database, labelled 'Switch A In', 'Switch B In' and 'Switch Out'. 'Switch Out' is a source device that will either be linked to 'Switch A In' or 'Switch B In', depending on which video source is selected (i.e. the processed AV stream from "camera 1" or the AV stream from "camera 2 ENIC AIR 750 has one device, which is a destination device labelled. 'Monitor' (a monitor with a tally display). 'Monitor' is a 'pure' destination device (LINKED=0) since it does not supply data to another source device. The "Monitor" device receives video from the AB switch via ENIC_AB_SWITCH 740 and has a tally that displays the METADATA from its source device, which is the 'Switch Out' source device of ENIC_AB_SWITCH 740.

First consider how the propagation of a change in the tally text data of a source device propagates through the network connections to a final destination device is achieved according to the present technique. Consider, for example, that the AB switch is showing channel A and the METADATA of Camera 1 changes. If the tally text entry of 'camera 1' is changed from "FRED" to "ROB", corresponding to a change in the current cameraman, then ENIC_1 710 will send a request to the network manager 4 to changed the tally text data associated with the 'camera 1' source device from "FRED" to "ROB". The network manager will query the network configuration database and examine each destination device that is subscribed to the multicast group on which the camera 1 source data is transmitted. The network manager 4 will update the view of any client that is displaying the tally text data of the ENIC_1 source device. If any of these destination devices is a linked device (i.e. if it supplies the received data to a further source device), then it navigates to the corresponding linked source device and update all of its destinations, and so on. In the arrangement of FIG. 7, the destination device 'DME In' of ENIC DME 730 is linked to the source device 'DME Out' on the same ENIC (i.e. linked to a different port on the same ENIC). The source device 'DME Out's' tally text (E1) is concatenated to ROB to form ROB E1 and all of the destinations currently receiving data from 'DME Out' must be notified. The only destination device of ENIC_AB_SWITCH 740 is 'Switch A In'. Since the switch is currently set to receive data from channel A (i.e. from camera 1), 'Switch A In' (but not 'Switch B In') is currently a linked destination device, since it supplies the 'Switch Out' source device of (the same ENIC) ENIC_AB_SWITCH 740 and hence all destinations of "Switch Out' are updated. In this example, 'Switch Out' only has one destination device and this is a pure destination 'Monitor' on ENIC_AIR 750. Thus, the tally of 'Monitor' is updated with 'ROB_E1' (which replaces 'FRED_E1'). Hence the tally text change has been effectively propagated throughout the relevant nodes of the network.

Next consider performing an AB switch so that instead of the output of "camera 1" being displayed on the monitor, the output of "camera 2" is instead displayed.

In this case a request is sent to the network manager 4 to perform a seamless AB switch between destination devices 'Switch A In' and 'Switch B In' on ENIC_AB_SWITCH 740. The network manager 4 consults the network configuration database to determine the current status of the ENICs associated with the proposed switch and provided that the network is correctly configured, the network manager initiates the change in the virtual circuit-switched connections necessary to effect the switch between the two source devices. The source device on ENIC 2 720 from which destination device 'Switch B In' on ENIC_AB_SWITCH 740 derives its data is associated with 'camera 2'. Using the network configuration database of the network manager 4 it is possible navigate to 'Camera 2' and update its status as being *ON AIR*. Similarly, 'Camera 1' can be designated as *OFF AIR* by navigating back through the devices from 'Switch A In' when the switch AB configuration is changed such that the connection to 'Switch A In' is active again. The correct tally text, which is the tally text associated with 'Camera 2',i.e. "JIM", can now be propagated to 'Monitor' as already described to replace the currently displayed tally text "FRED_E1" or "ROB_E1" associated with 'Camera 1'.

2. Sending Data to the Network FIGS. 6B and 6C.

Figure 6B:
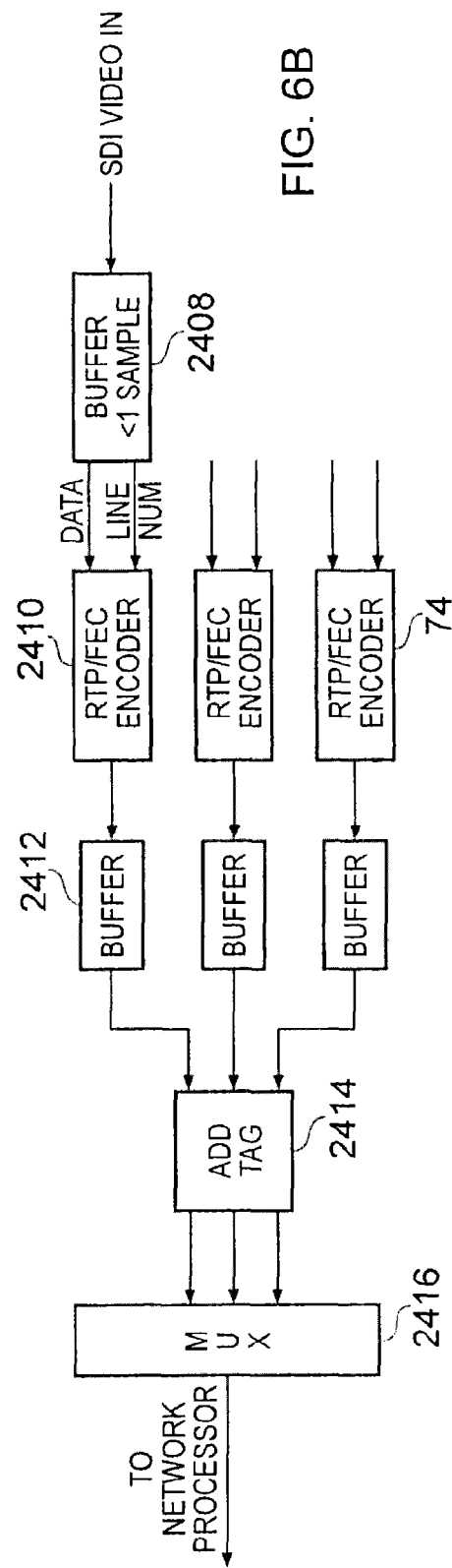

Referring to FIG. 6B, one channel of SDI video is received by a buffer 2408 from an SDI source such as a camera. The buffer 2408 stores the video temporarily whilst it is packetised by an RTP/FEC encoder 2410 and sent to a buffer 2412 for temporary storage. A tag generator 241 adds to the RTP packets a tag comprising flow and type data as shown in FIGS. 5A and 5B. A multiplexer 2416 receives the tagged packets from the tag generator and multiplexes the video packet with other video packets from similar video channels. The tag is defined by data produced by the CPU 26 in response to an AVSCP message received from the network controller 4. As shown schematically in FIG. 5C, the packet switch directs the video packets to the network processor (net) or to the PCI 28 according to the flow data in the tag. Audio packets are similarly processed and routed.

Where packets are to be routed to the network, a header generator 210 (FIG. 4) strips the tag from the packet and, based on the flow and type flags, generates an appropriate part of the network header which is appended to the packet.

Proxy Video

Figure 8:
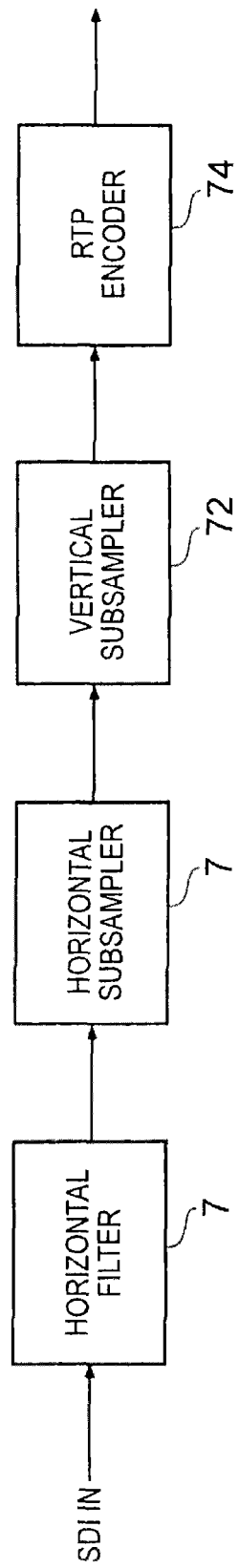
FIG. 8 is a schematic block diagram of a proxy generator of the network interface.

Referring to FIG. 8, proxy video is generated from SDI video as follows. A horizontal filter 70 applies a low-pass FIR filter to the SDI input data. The output of the horizontal filter is supplied as input to a horizontal subsampler 71, which subsamples the SDI video horizontally to reduce the horizontal resolution. A vertical subsampler 72 reduces the vertical resolution of data received from the horizontal subsampler 71. The resulting proxy video is then encoded by an encoder 74 to form RTP packets. There is one proxy video generator for each video channel. The proxy video is processed in the same way as the SDI video by the packetiser 24, the packet switch 22 and the network processor 20. The proxy video is always directed to the switching and routing client 6, or one of the switching and routing clients 6 and 61. Thus one proxy video stream is multicast in a first multicast group to which the client 6 and/or 61 joins and the SDI video (from which that proxy video is derived) is multicast in a second multicast group. The multicast group is defined by the class D IP address that identifies the data stream. In an alternative embodiment alternate fields of either the proxy video stream or the higher-resolution SDI video stream could be assigned to different multicast groups.

In a currently preferred example of the invention, the proxy video comprises 180 samples×144 lines (PAL) or 180 samples×120 lines (NTSC) and 25 or 30 frames per second, with horizontal and vertical filtering. The number of bits per sample may be 24 bits (i.e. 3 colours, each 8 bits) or 16 bits (i.e. 3 colours, each 5 bits).

Switching and Routing Client 6

Figure 9:
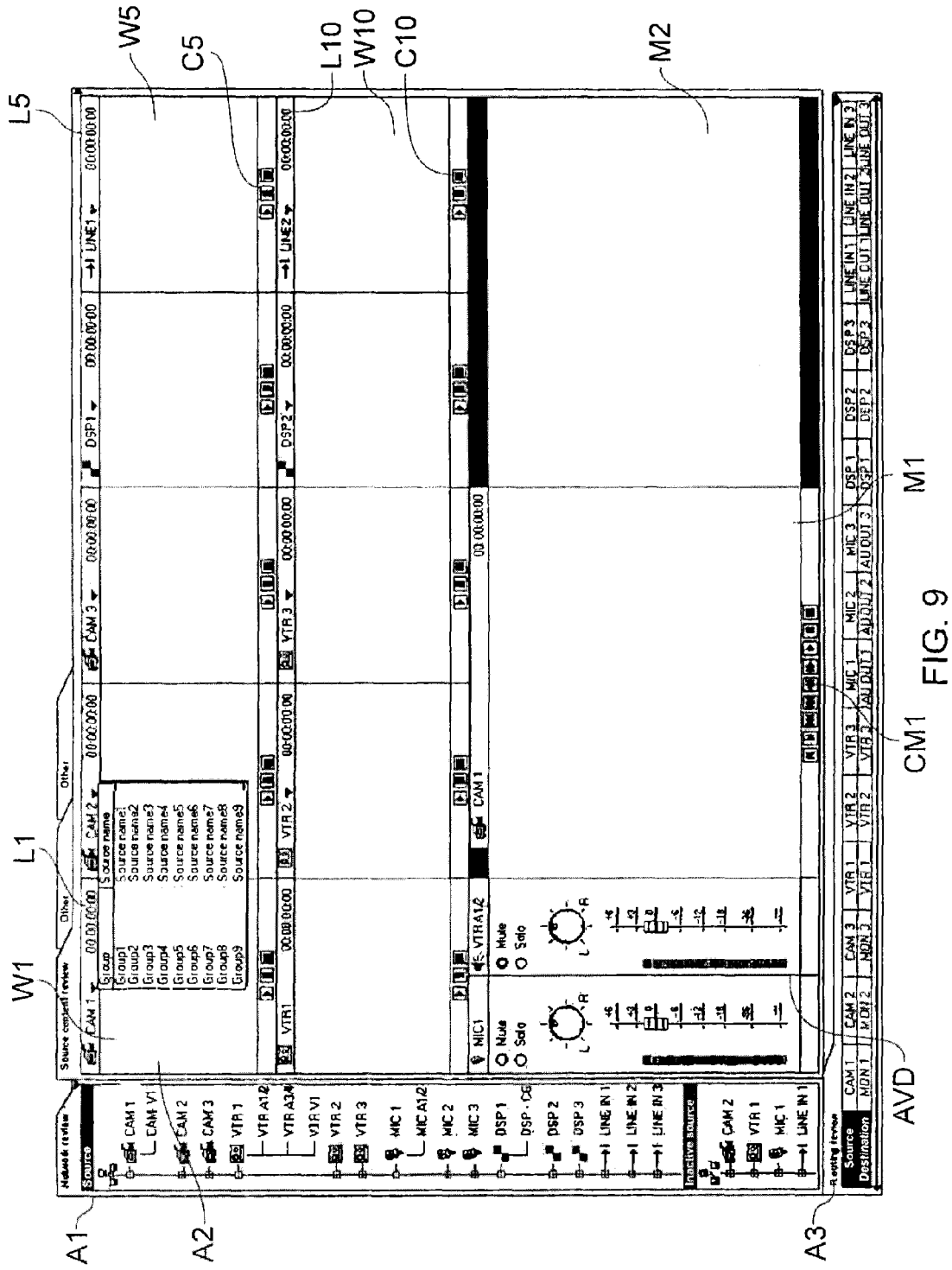
FIG. 9 is a schematic diagram of one example of the display of a Graphical User Interface (GUI)
Figure 10:
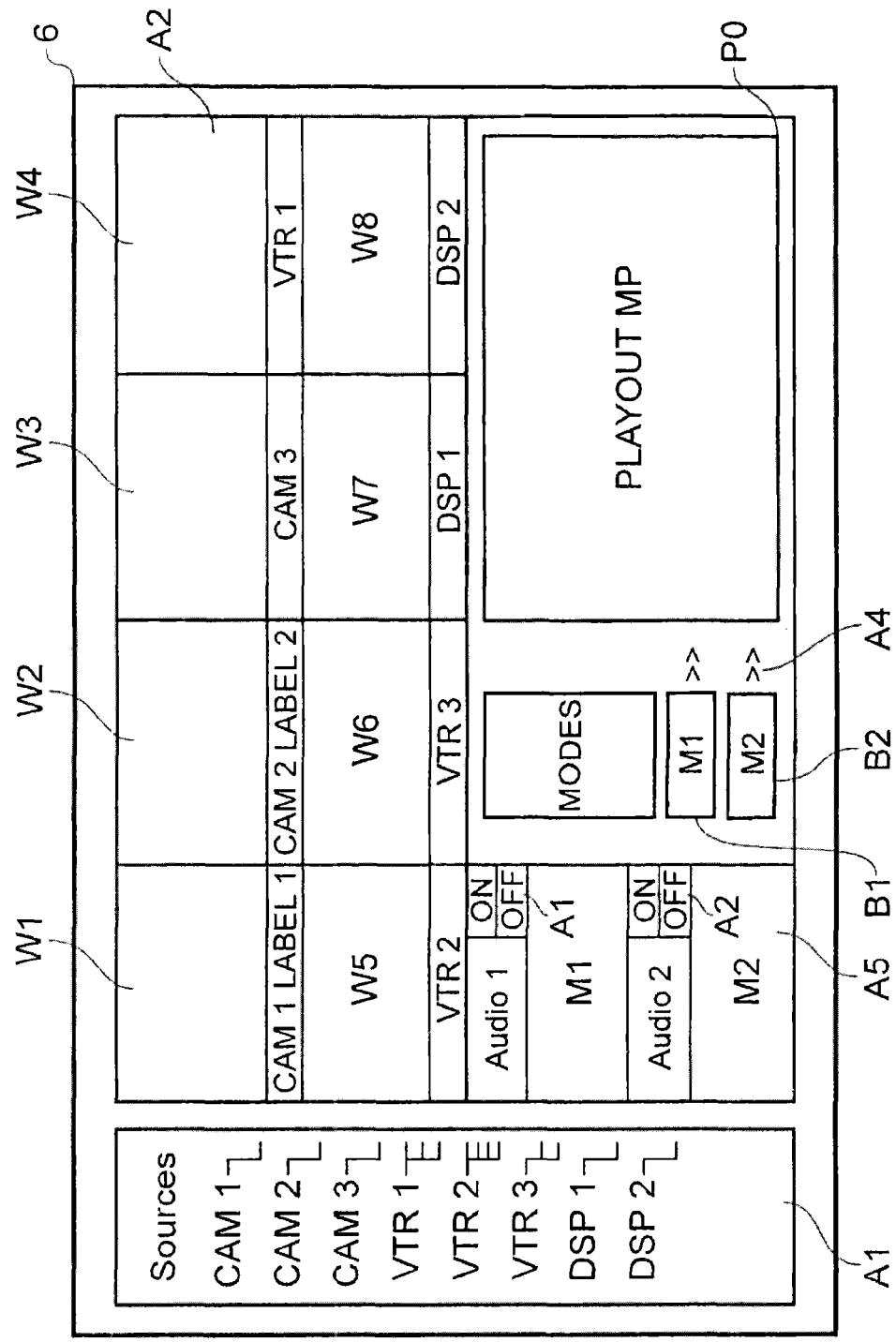
FIG. 10 is a schematic diagram of another example of the display of a Graphical User Interface (GUI)

Referring to FIGS. 9 and 10, examples of graphical user interfaces (GUI) are shown. In this example, the GUI is provided by the switching and routing client 6, which is a PC having a monitor, keyboard and mouse. However the GUI may be provided by the network manager 4 or by both the network manager 4 and the switching and routing client 6. The GUI is an interface with underlying software that reacts to actions taken (for example mouse-clicks or keyboard entries) by the user using the GUI.

Data Flows

The GUI displays information about the configuration of the network provided to it by the network manager 4. That information is provided using the CNMCP protocol as discussed above. The GUI also displays proxy video provided by the ENICs using the Real Time Transport protocol (RTP) described above. The proxy video is multicast across the network by the generating source group via the ENICs and to receive it the switching and routing client 6 joins the multicast groups of the proxy video streams. The routing of data is established using IGMP message commands. The GUI may be used to initiate control of a controllable source group such as a VTR or a destination group such as a video processor. The switching and routing client 6 unicasts control data directly to the ENIC associated with the CONTROL SOURCE GROUP in response to an action taken via GUI. Unicast control data is described above. The switching and routing client 6 receives status stream data which is multicast as described above when it joins the multicast group on which the status stream data is transmitted.

When the GUI is used to initiate a routing of video from a source device to a destination device, it sends a CNMCP message to the network manager 4. The network manager then sends an AVSCP message to the ENIC associated with the destination device to cause it to join the destination device to the required multicast group.

The switching and routing client 6 is able to send IGMP join messages to the network. However, the switching and routing client 6 may also self-subscribe to a multicast group for communication of status, audio and proxy data streams only. The network manager controls client access to a multicast group corresponding to a video stream.

The GUI

The following description assumes that the GUI is operated in conventional manner using at least a pointing device such as a mouse and/or a keyboard. Alternatively, a keyboard interface having "hot keys" mapped to particular GUI commands or a touchscreen interface may be used to issue commands. The GUI of FIG. 9 has three main display areas A1, A2, and A3.

The area A1 is a network management area displaying graphical representations of the groups (e.g. Cameras CAM1 etc and VTRs VTR1 etc) and their source devices (e.g. output CAM V1 of CA 1). The graphical representations of the groups are displayed with the tally text (e.g. CAM1) and the source devices with their sub-tally text (e.g. CAM V1). The data for creating the display in the area A1 is derived from the database held by the network manager and provided to the switching and routing client using CNMCP messages.

The area A2 is a source content review area which has a plurality of proxy video display areas or windows W1 to W10. In this example there are 10 such windows but there can be any convenient number. The windows W1 to W10 display proxy video. In this example the proxy video to be displayed in the windows is chosen by dragging a source device from the network management area A1 and dropping it into a chosen window. The display window also has an identifier that indicates the source group with which the currently displayed proxy video is associated. This drag and drop event causes the underlying software to send an IGMP join message to the network for the switching and routing client 6 to join the multicast group on which the proxy video associated with the selected source device is being transmitted.

The windows have respective label areas L1 to L10 in which the GUI displays the appropriate tally text and/or sub tally text associated with the source device.

The area A3 is a routing review area comprising buttons B which act as switches. There are two rows of buttons in this example: a row of buttons associated with source groups and/or source devices and labelled with the appropriate tally text corresponding to the source and a row of destination buttons labelled with tally text corresponding to the associated destination. A user may select (via a mouse-click event, by keyboard entries or by touching the appropriate region of a touch-screen interface) on the GUI area A3 a source button and one or more destination buttons and in response to such a selection communication paths are set up such that the source indicated by the selected source button is linked across the network to the selected destinations. In the example of FIG. 9, the highlighted buttons show CAM1 is linked to MON1, VTR2, and DSP2 and audio data associated with CAM1 is linked to AU OUT3.

By way of further explanation, assume a source CAM1 is to be connected to MON1. When a switching and routing client 6 starts up, it connects to the network manager on a known port 4 and the network manager 4 sends information on the source devices, which are available to it. This allows the client to form a view of the network. This view of the network will be reflected to a user in the GUI display. Each device is delivered to the client with an ID, which the client will use to describe the device in subsequent communication with the Network Manager. A destination device may be a monitor for example. If the client wishes to route video from a source group (e.g. a VTR) then it will send to the network manager 4 a CNMCP Switch message that contains the IDs of the destination device and of the source device.

If the client is not permitted to perform this operation then the Network Manager will send a CNMCP NAK message to the client in response. Otherwise it will process the request as follows.

The network manager 4 will examine the network configuration database and determine which multicast IP address the video is being transmitted to. An AVSCP Switch message will be created that contains this IP address and it is sent to the EN IC, which connects to the Monitor. The ENIC embedded software sends an IGMP Join message to this IP address and sends an AVSCP ACK message back to the Network Manager. The ENIC should now be receiving the desired video data and will send it to the SDI output that connects the Monitor. Meanwhile, the network manager 4, having received the AVSCP ACK message, will update the routing information in the database. The network manager 4 sends a CNMCP ACK message back to the client to indicate success.

The GUI of FIG. 9 preferably also includes, as shown, two further display areas M1 and M2 for showing the video displayed on play-out monitors MON1 and MON2. In this example MON2 has a dark border indicating that it shows the video currently being played out on LINE OUT1 from for example VTR1. MON1, which has a lighter border, shows the video from CAM1, which has been preselected for play-out next. The video may be selected for display in the windows MON1 and MON2 by dragging and dropping proxy video from windows W1 to W10 into MON1 and MON2. The video to be played out may be selected or switched over by clicking on MON1 or MON2.

The GUI of FIG. 9 has an audio control display area AVD.

The GUI also has virtual user controls C1 to C10 associated with the windows W1 to W10 and user controls CM associated with the MON1 and 2 windows. Operation of such a user control causes the underlying software to send unicast control data UCD across the network directly to the source group from which the video in the associated window originates. Alternatively, or in addition, C1 to C10 can indicate the current status of the relevant device.

The GUI of FIG. 10 differs in minor ways from that of FIG. 9. It has proxy video display areas W1 to W8, a network management area A1 (shown only schematically) identical to that of FIG. 9, and monitor displays 'M1' and 'M2' in an area AS. The GUI of FIG. 10 lacks the rows of source and destination buttons corresponding to the area A3 in FIG. 9, but has two buttons M1 and M2 which act, similarly to the buttons of FIG. 9, as switches. The buttons M1 and M2 select for play-out video associated with an associated one of windows M1 and M2. The currently played out video is displayed in the play-out window PO.

The windows 'M1' and 'M2 have associated audio controls A1 and A2 for switching on and off an audio monitor to allow the user to monitor the audio associated with the video of windows M1 and M2.

The video to be displayed in windows M1 and M2 is dragged and dropped into those windows from the proxy video windows W1 to W8. Such a drag and drop event causes the full resolution video (rather than proxy video) to be sent from the sources to full resolution monitors such as MON1 and MON2 in FIG. 1 and to a video switcher such as D8 in FIG. 1 via ENIC NI8. Accordingly, the reduced-bandwidth proxy video assists the user in selection of which virtual circuit-switched connections to establish in the network and the data stored by the network manager 4 correlating each proxy video source with the full resolution data stream from which it was derived enables the data communication path to be set up in response to user initiated GUI events. Note that each source group for which a proxy video stream is generated is associated with at least two multicast IP addresses, the first multicast IP address being that on which the full-resolution video data is transmitted and the second multicast IP address being that on which the lower-resolution proxy video data is transmitted. Operating the button M1 or M2 causes the underlying software to send unicast control data UCD via the ENIC NI8 to the video switcher causing the video switcher to switch between the two different data sources.

Figure 11:
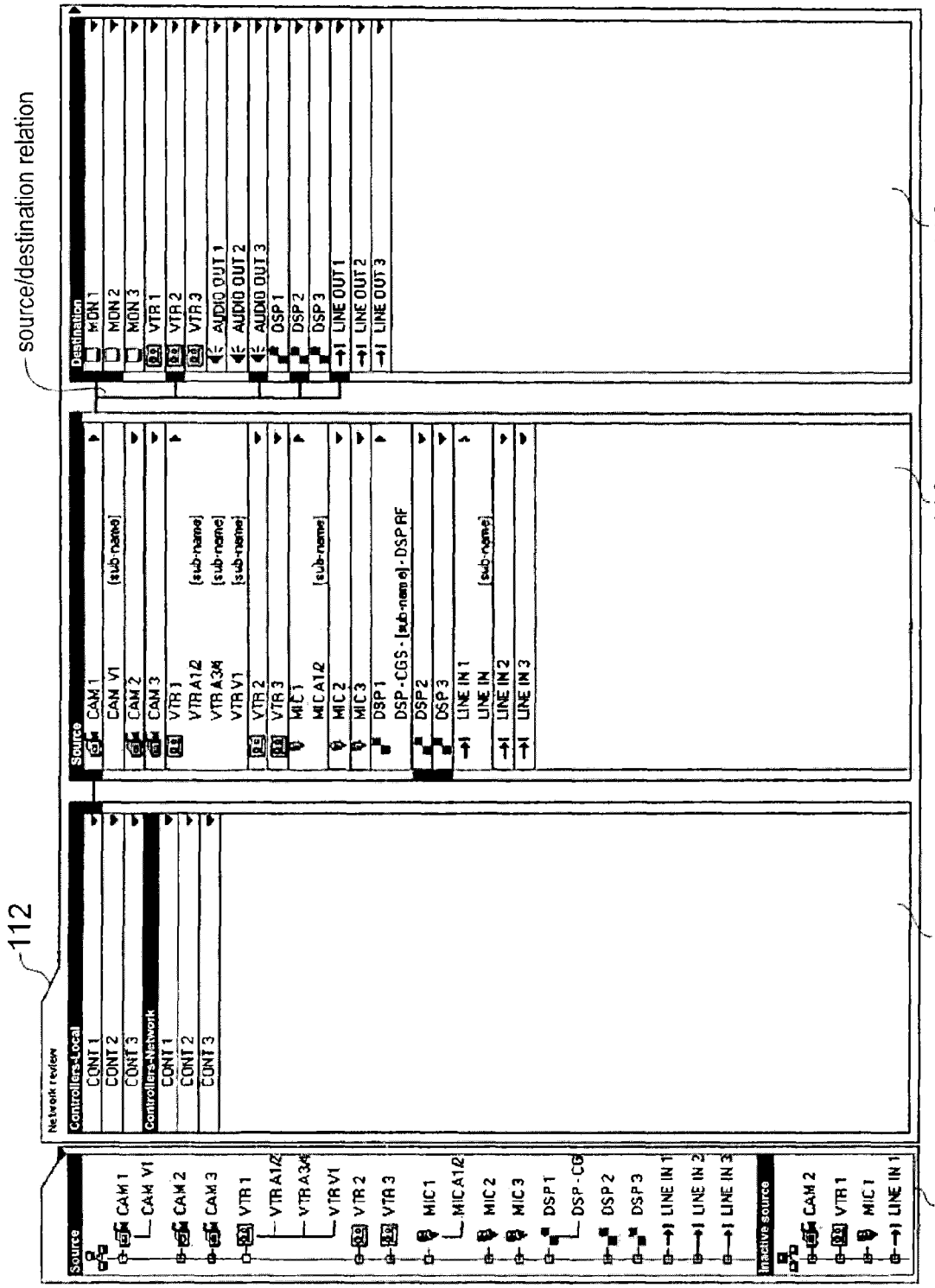
FIG. 11 is a schematic diagram of an example of a graphical interface for illustrating the configuration of the network.

FIG. 11 schematically illustrates a GUI that presents the operator with an overview of the network configuration. The GUI comprises a first source panel 110 that displays active sources and inactive sources belonging to the IP network. Source groups such as cameras CAM1, CAM2, CAM3 are represented. The video tape recorder group VTR1 has separate audio VTR A ½ VTR A ¾ and video VTR V1 devices associated with it (i.e. three different input/output terminals), which are also displayed. Both the source type e.g. MIC1 for a first microphone and the source name MIC A1/2 that specifies the audio channel device are represented in the first source panel 110. The source type is represented by an icon but the source name is not. An input may be selected by highlighting a desired source on the first source panel 110, for example camera 1 (CAM1) is currently selected. A network review panel 112 comprises three sub-panels: a controllers sub-panel 114, a source sub-panel 116 and a destination sub-panel. The connection between a controller, a source and one or more destinations is represented by colour-coded branch connections between entries in the three sub-panels. The current configuration shows that a first controller CONT1 is controlling the source group CAM1, which in turn is providing data to six different destination devices i.e. two monitors MON1, MON2, VTR1, an audio output AUDIO OUT3, a digital signal processor DSP2 and an output line LINE OUT1. The source sub-panel 116 provides pull-down menus for each source that provide more detailed information about devices e.g. audio and video data streams associated with that source. The relationship between a source and digital signal processors (DSP) is indicated by colour coding in the left hand margin of the source sub-panel 116, for example in this case CAM1 is associated with both DSP2 and DSP3. The names of the sources e.g. CAM1, VTR1, MIC1 are derived from the tally text. The GUI of FIG. 11 is operable to display status information (e.g. on air/off-air) associated with source devices or destination devices of the network. This status information is supplied to the network by the corresponding device as status packets. The network manager 4 collates the status data in the network configuration database and the GUI representation is updated at regular intervals based on the updated information in the database.

Figure 12:
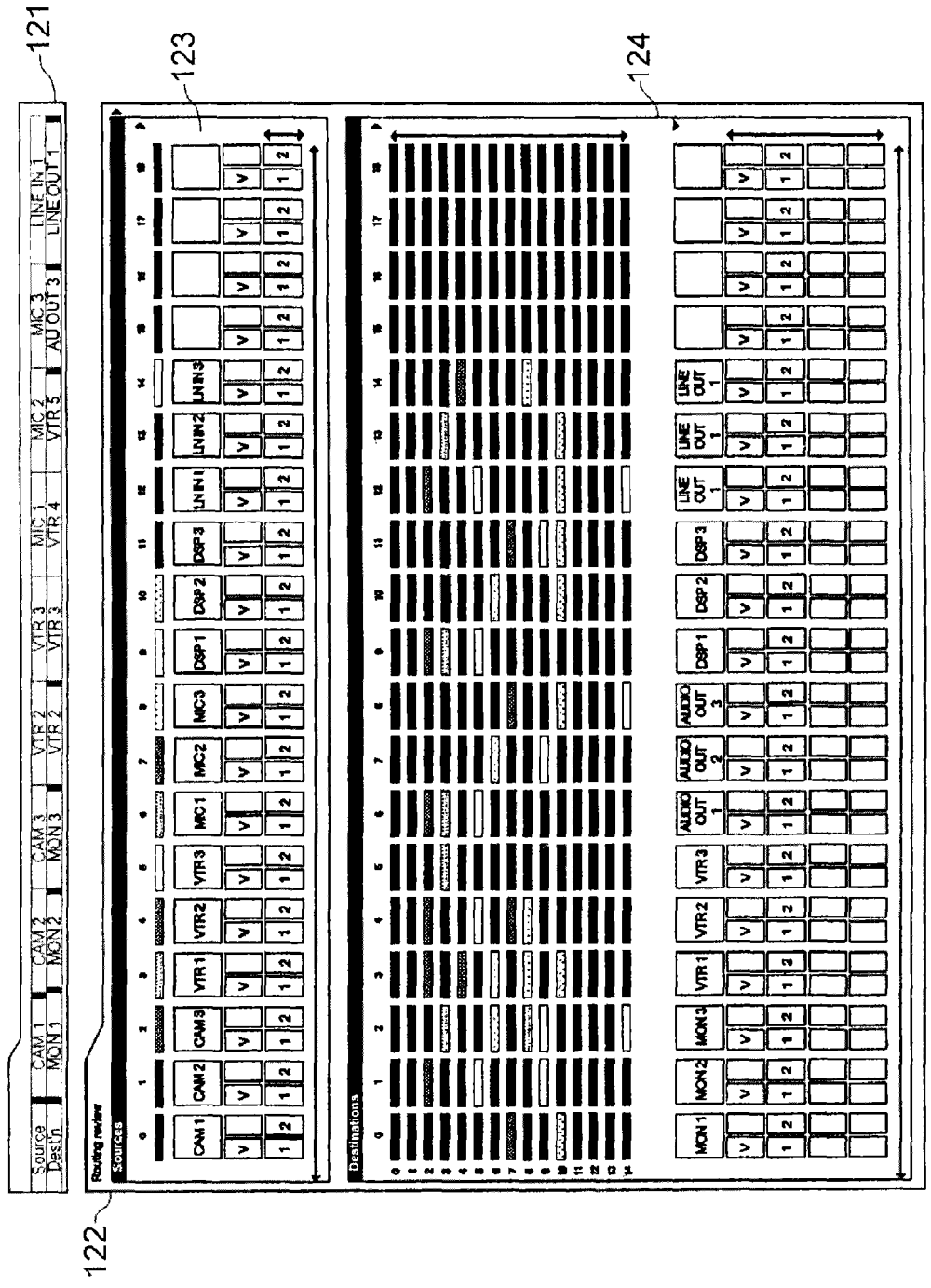
FIG. 12 is a schematic diagram of an example of a graphical interface for illustrating how data is routed across the network.

FIG. 12 schematically illustrates a GUI which provides one way of indicating the connections between sources and destinations across the network. An area 120 depicts groups (e.g. CAM1) and the associated source devices (e.g. V1, V2) and area 122 denotes destinations. Each source group has a coloured bar 124 associated with it. Area 121 is a matrix which uses the coloured bars to indicate the connections between sources and destinations. The GUI shown in FIG. 12 provides the user with an overview and an interface for displaying to an operator how the data is being routed across the network. The GUI comprises a routing review overview panel 121 at the top of the screen and a main routing review panel 122 comprising a source sub-panel 123 and a destination sub-panel 124. The overview routing review panel 121 provides an easily comprehensible overview of the relationships between sources and destinations. This is achieved by colour-coded highlighting. This panel 121 currently indicates that source CAM1 is connected to destinations MON1, MON2, MON3, VTR2 and AUOUT3. By clicking on a given source area of the routing review overview panel 121, that source and any destinations associated with it are highlighted. The sources sub-panel 124 provides an expanded view of the source in which both the source group e.g. CAM1 and the associated device V1 or V2 are graphically represented. Similarly, the destinations sub-panel provides an expanded view of the destination groups. From the highlighted areas in the sources sub-panel 121 and the destinations sub-panel 124 it is apparent that CAM1 device V1 is connected to devices V1 and V2 of MON1 for example. The destination sub panel 124 also provides a graphical colour coded matrix representation of source-destination connections.

In the network arrangement having a GUI according to the examples of FIGS. 9 to 11, it is assumed that the user is able to view the complete configuration of the network, based on all available data stored in the network configuration database by the network manager 4. However, in alternative arrangements, the network manager 4 is operable to store user-specific profiles according to which each user is assigned to a particular access-permissions level with regard to the portion of the network configuration that can be viewed and the virtual circuit-switched connections which that user is authorised to establish or delete. The allowed access-permissions level specified by the user-specific profile could be determined by the job of the user (for example, cameraman, editor, director, producer) or simply by a unique ID associated with the individual user. Thus for example, the director may have access enabled to view the current configuration of the entire network but no permission to alter the virtual circuit-switched connections whereas a cameraman could have access both to view and change the configuration or a subset of the network of which the camera that he operates forms a part.

Figure 13:
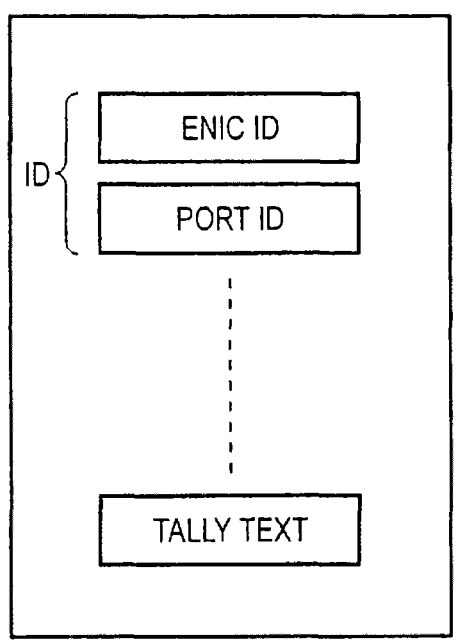
FIG. 13 schematically illustrates a user interface provided on the network manager via which a user may enter configuration data.

FIG. 13 schematically illustrates a user interface provided on the network manager via which a user may manually enter configuration data. When a device is connected to the network, the user informs the network manager 4 that this is the case via the user interface. The interface comprises an ENIC ID dialog box, a PORT ID dialog box and a TALLY TEXT dialog box. The user enters into dialog boxes data required by the manager to determine the configuration of the network. The ENIC ID entry is a user-defined identifier e.g. ENIC6, the PORT ID entry specifies the ENIC port to which the device has been connected and the TALLY TEXT entry specifies the freely assignable label (referred to above as tally text) used as a source/destination identifier. The tally text ID is used in addition to (rather than as an alternative to) the source and destination identifiers ID discussed above.

REFERENCES

1, RTP Payload Format for BT.656 Video Encoding, D. Tynan, (Claddagh Films) RFC2431, October 1998

The invention claimed is:
1. An interface circuitry configured to connect to video processor circuitry, the interface circuitry comprising:

input circuitry configured to receive video and/or audio data packets from first and second sources via an asynchronous packet switched network;

output circuitry configured to selectively output first and second video and/or audio streams corresponding to said packets from first or second sources respectively; and a processor configured to control switching from a first video and/or audio stream to second video and/or audio stream by launching a request to join a multicast group attributed to the second source, wherein the input circuitry is further configured to buffer data packets multicast from said second source, the output circuitry is further configured, under control of the processor, to output video and/or audio frames corresponding to data packets multicast from said second source which are frame-aligned with respect to frames output corresponding to data packets from first source upon switching from a first to a second video and/or audio stream, and the data packets from the first source differ from the data packets from the second source, and launching the request to join the multicast group attributed to the second source is initiated via a computing device having a graphical user interface (GUI) configured to allow selection of the second video and/or audio stream.

2. The interface circuitry of claim 1, wherein said output circuitry is configured to selectively output first and second video and/or audio streams, the streams being synchronized by clock synchronization circuitry.

3. The interface circuitry of claim 2, wherein output video and/or audio frames are frame-aligned by frame synchronization circuitry.

4. The interface circuitry of claim 3, wherein the frame synchronization circuitry is configured to receive line delay information.

5. The network according to claim 4, wherein the frame synchronization circuitry is configured to receive the line delay information as a 32-bit line delay value that specifies a number of video lines by which to delay playout.

6. The interface circuitry of claim 3, wherein the frame synchronization circuitry is configured to receive frame synchronization packets.

7. The interface circuitry of claim 1, wherein the request to join a multicast group is an internet group management protocol (IGMP) join message.

8. The interface circuitry of claim 1, wherein the input circuitry is further configured to receive multicast video and/or audio proxy packets representing video and/or audio proxy streams of lower resolution than said first or second video and/or audio streams.

9. The interface circuitry of claim 1, wherein the first and second video and/or audio streams comprise packets having an Ethernet header, and internet protocol (IP) multicast header, a user datagram packet (UDP) header and real time protocol (RTP) header and payload video and/or audio data.

10. The interface circuitry of claim 1, wherein said output circuitry is configured for connection to a video switch or video editing apparatus.

11. The interface circuitry of claim 1, further comprising:
depacketizer circuitry configured to assemble said data packets into serial digital interface (SDI) video streams prior to output.

12. The interface circuitry of claim 1, wherein said processor is further configured to launch a request to delete a video and/or audio stream from a multicast group.

13. The interface circuitry of claim 1, wherein each of the first source, the second source and a recipient of an output of the output circuitry are assigned identifiers, and the processor is configured to route the video and/or audio frames from at least one of the first source and the second source to the recipient based on the assigned identifiers.

14. The interface circuitry of claim 1, wherein the processor is further configured to retrieve from a database the multicast address via which the second video and/or audio stream is distributed as a result of launching the request to join a multicast group attributed to the second source.

15. A method of switching from a performing switching from a first to a second video and/or audio stream comprising:
receiving video and/or audio data packets from first and second sources via an asynchronous packet switched network;

selectively outputting first and second video and/or audio streams corresponding to said packets from first or second sources respectively; and controlling switching from a first video and/or audio stream to second video and/or audio stream by launching a request to join a multicast group attributed to the second source and buffering data packets multicast from said second source and outputting under control of the processor video and/or audio frames corresponding to data packets multicast from said second source which are frame-aligned with respect to frames output corresponding to data packets from first source upon switching from a first to a second video and/or audio stream, wherein the data packets from the first source differ from the data packets from the second source, and launching the request to join the multicast group attributed to the second source is initiated via a computing device having a graphical user interface (GUI) configured to allow selection of the second video and/or audio stream.

16. A non-transitory computer-readable medium encoded with computer-readable instructions that, when executed by a computing device cause the computing device to generate a graphical user interface to control interface circuitry, and to perform a method comprising:
receiving video and/or audio data packets from first and second sources via an asynchronous packet switched network;

selectively outputting first and second video and/or audio streams corresponding to said packets from first or second sources respectively;

controlling switching from a first video and/or audio stream to second video and/or audio stream by launching a request to join a multicast group attributed to the second source;

buffering data packets multicast from said second source; and outputting video and/or audio frames corresponding to data packets multicast from said second source which are frame-aligned with respect to frames output corresponding to data packets from first source upon switching from a first to a second video and/or audio stream, wherein the data packets from the first source differ from the data packets from the second source, and launching the request to join the multicast group attributed to the second source is initiated via a computing device having a graphical user interface (GUI) configured to allow selection of the second video and/or audio stream.

17. The non-transitory computer-readable medium of claim 16, further comprising:
performing a drag and drop event under user control and consequent upon that drag and drop event to send an internet group management protocol (IGMP) join message for the second video and/or audio stream attributed to the second source.

\* \* \* \* \*